United States Patent [19]

Thornton

[11] Patent Number: 5,054,987

[45] Date of Patent: Oct. 8, 1991

[54] LOAD TRANSFER DEVICE

[75] Inventor: George Thornton, Windsor, Canada

[73] Assignee: Valcomatic Systems, Inc., Windsor, Canada

[21] Appl. No.: 500,699

[22] Filed: Mar. 28, 1990

Related U.S. Application Data

[63] Continuation of Ser. No. 738,972, May 29, 1985, abandoned.

[51] Int. Cl.$^5$ ............................................. B65G 67/04
[52] U.S. Cl. ..................................... 414/390; 414/499;
414/439; 414/345; 414/529; 414/498; 414/500;
414/400; 104/235; 198/774.1
[58] Field of Search ............... 414/390, 391, 392, 395,
414/400, 401, 398, 340, 341, 345, 279, 278, 573,
385, 498, 497, 529, 532; 104/248, 236, 165, 235

[56] References Cited

U.S. PATENT DOCUMENTS

| | | | |
|---|---|---|---|
| 2,459,045 | 1/1949 | Pride | 414/500 |
| 2,785,818 | 3/1957 | Mercier et al. | 414/498 X |
| 2,863,397 | 12/1958 | Billings | 104/235 X |
| 3,188,977 | 6/1965 | Viktorsson | 104/235 |
| 3,268,099 | 8/1966 | Ajero et al. | 414/529 |
| 3,337,066 | 8/1967 | Reed et al. | 414/499 X |
| 3,727,777 | 4/1973 | Hanson | 414/400 |
| 3,780,893 | 12/1973 | Lassig et al. | 414/400 X |
| 3,945,522 | 3/1976 | Suizu et al. | 414/345 X |
| 3,952,887 | 4/1976 | Lutz | 198/774 X |
| 4,355,940 | 10/1982 | Derickson | 414/439 |

FOREIGN PATENT DOCUMENTS

| | | |
|---|---|---|
| 62342 | 10/1982 | European Pat. Off. . |
| 13271 | 2/1977 | Japan ............................ 414/400 |
| 1218259 | 1/1971 | United Kingdom . |
| 1438059 | 6/1976 | United Kingdom . |
| 1505116 | 3/1978 | United Kingdom . |
| 2059912 | 4/1981 | United Kingdom . |

Primary Examiner—Frank E. Werner
Attorney, Agent, or Firm—Harness, Dickey & Pierce

[57] ABSTRACT

A load transfer device for loading or unloading an entire storage compartment, such as the interior of a freight hauling trailer, in one cycle includes a long vertically flexible load support and transfer member that is as long and as wide as the storage compartment and which has a chisel-like leading edge to slip under freight articles resting on a floor, the transfer member being empowered by a motor mounted on it at the rear end to move longitudinally in and out of the storage compartment.

39 Claims, 17 Drawing Sheets

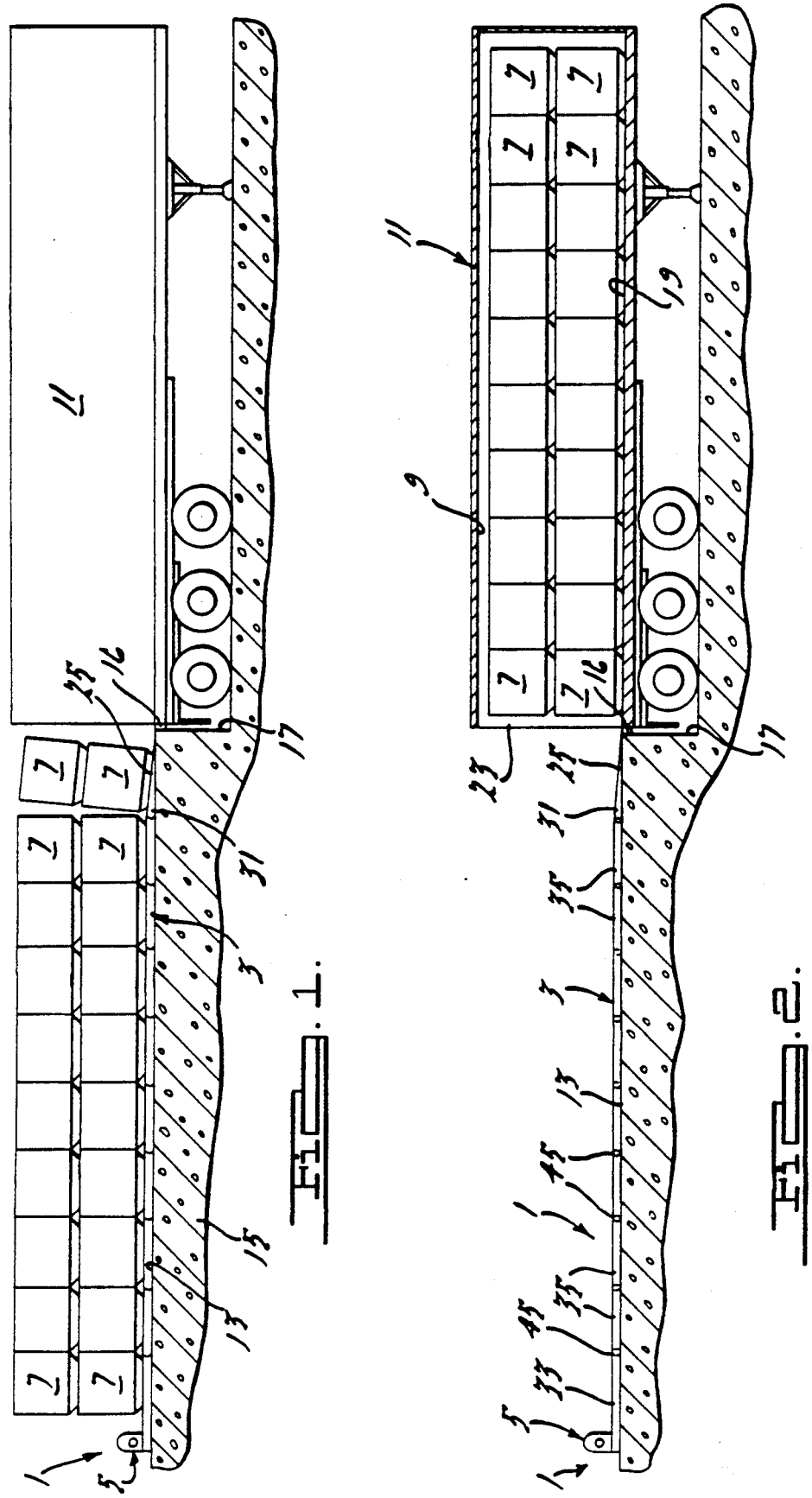

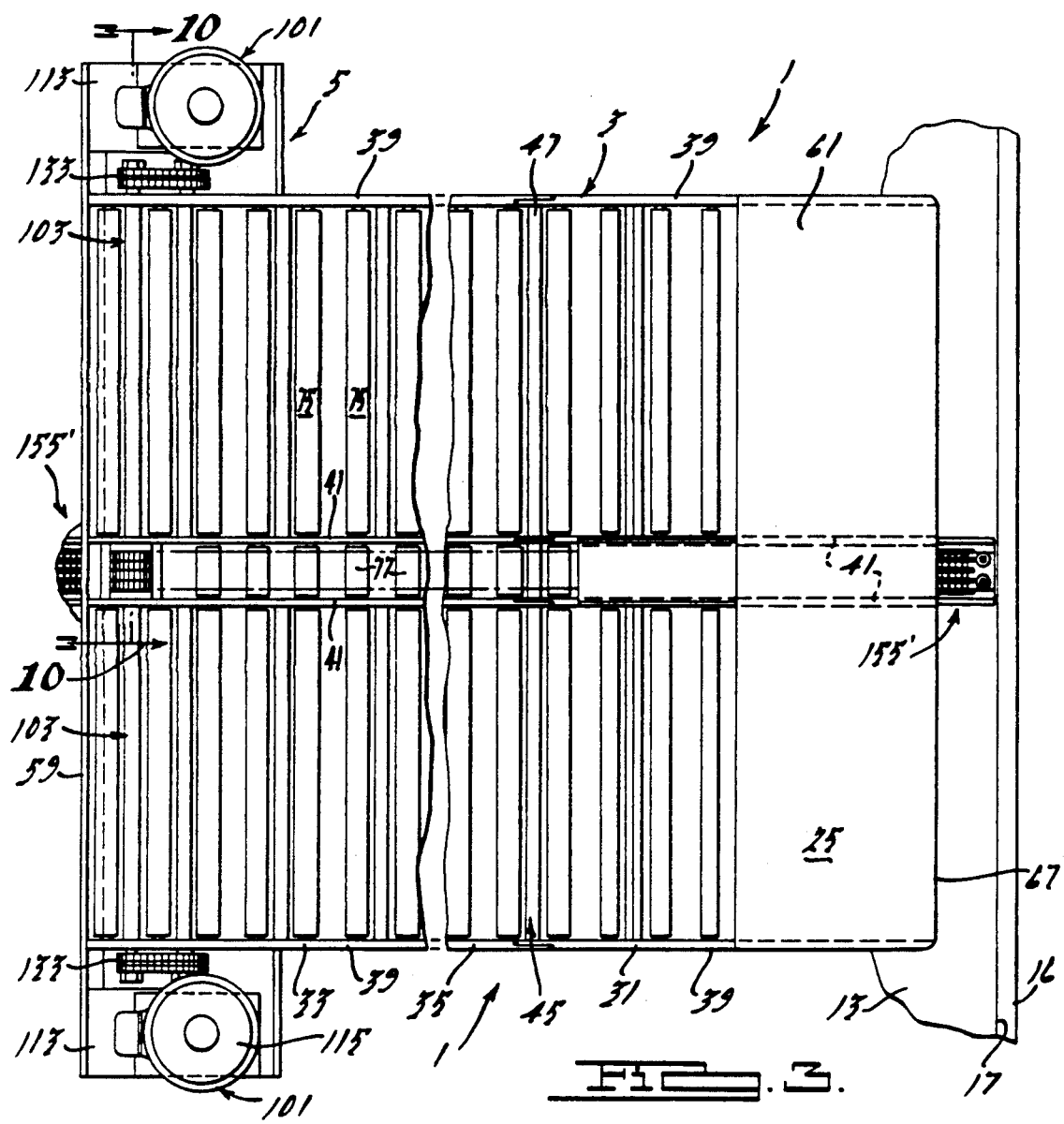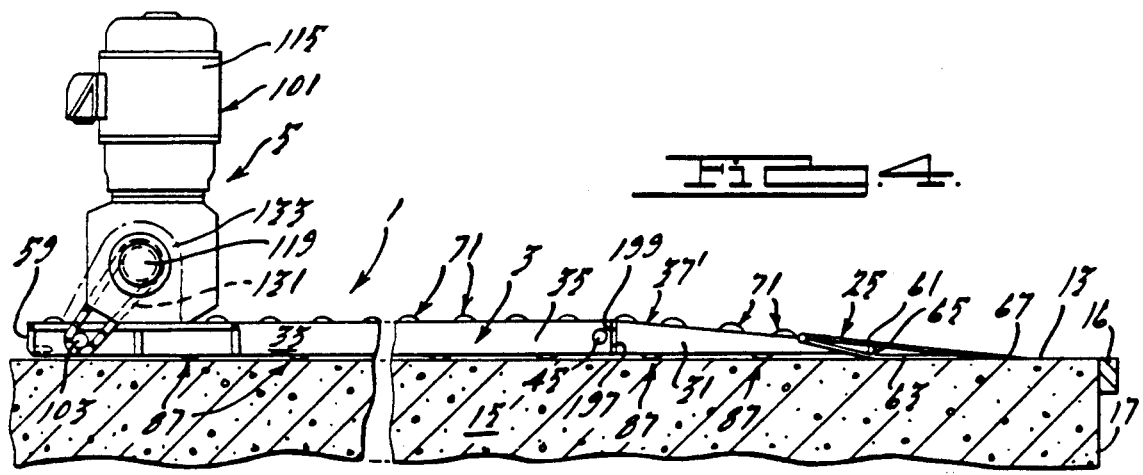

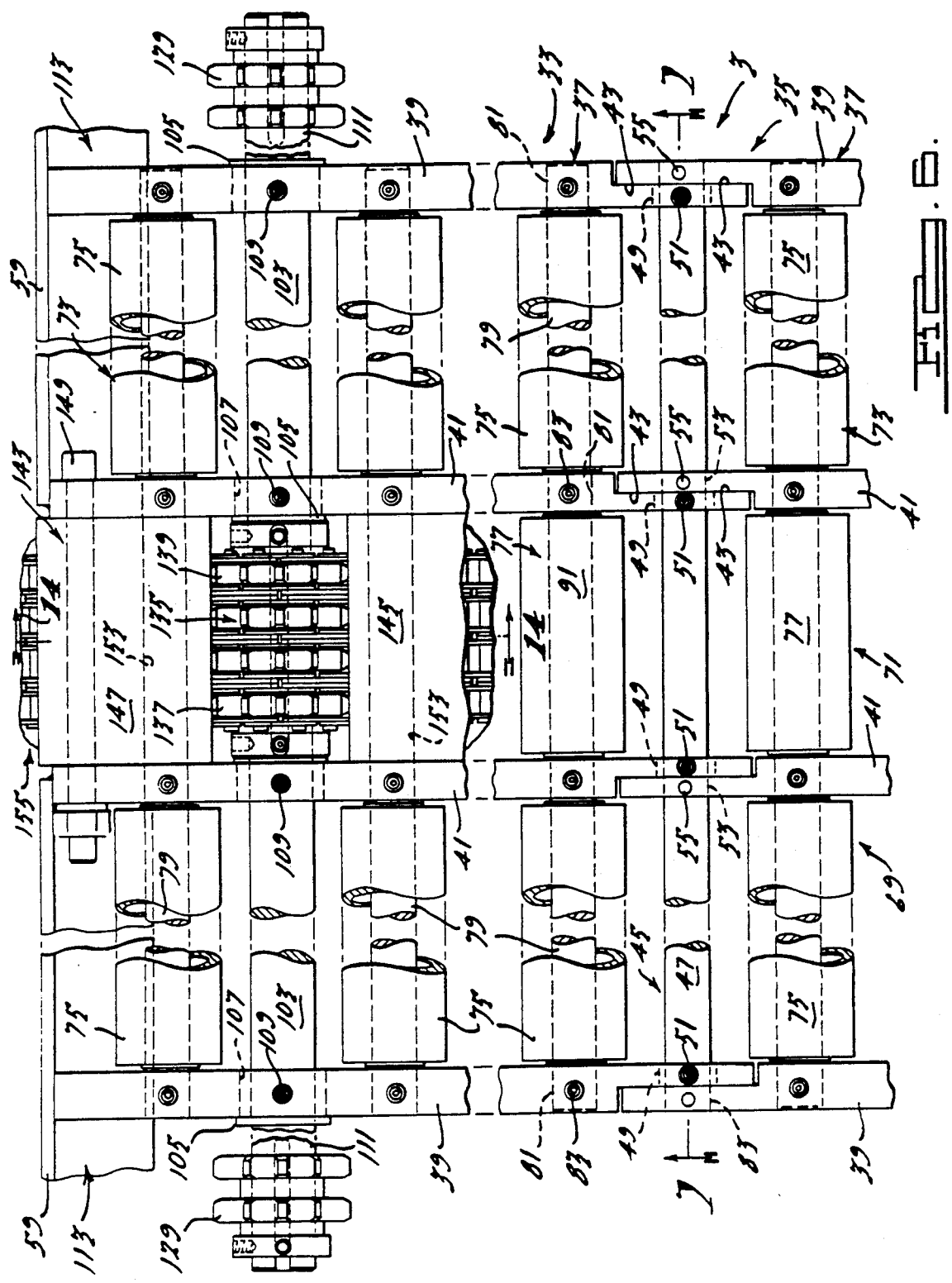

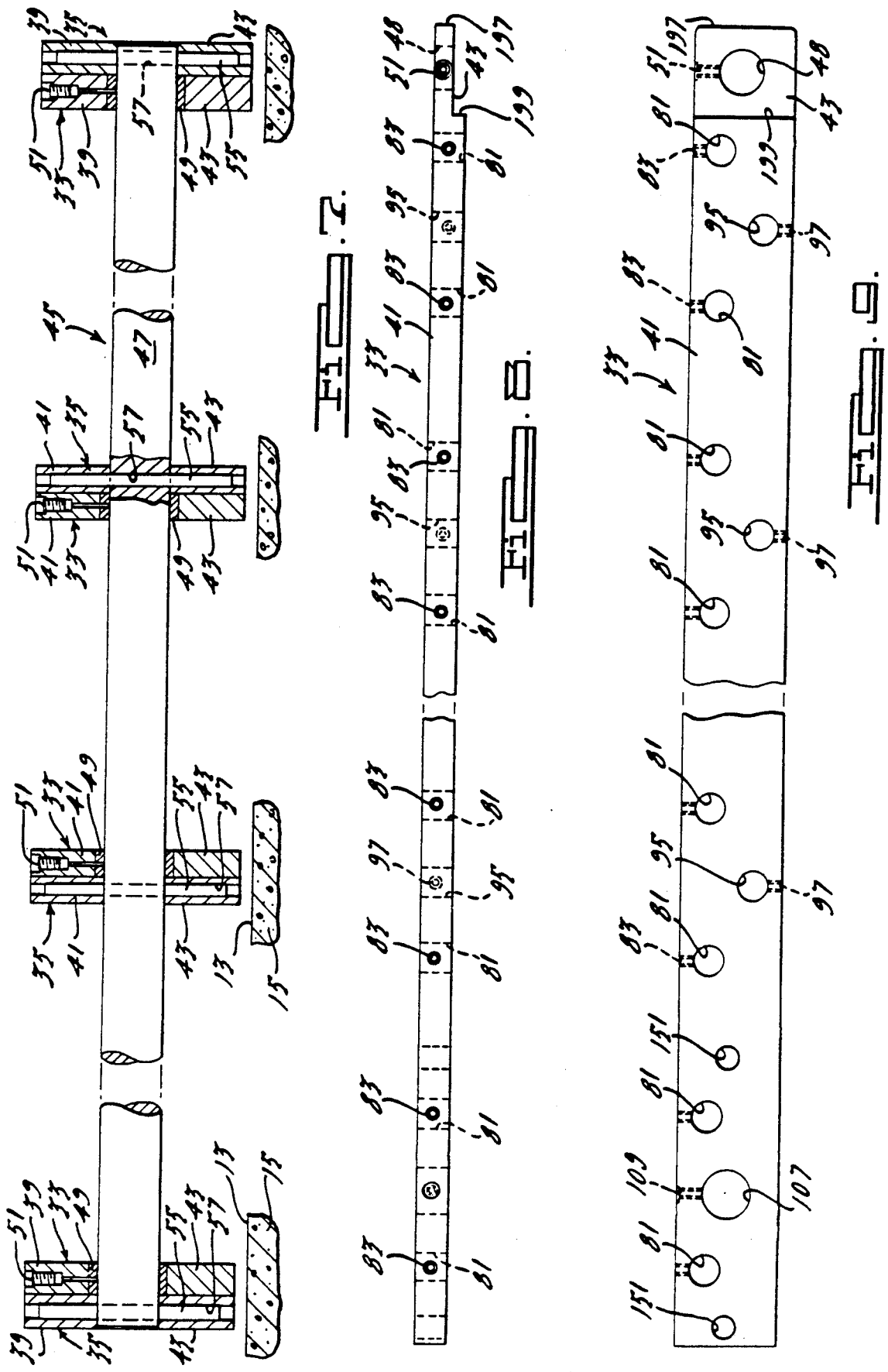

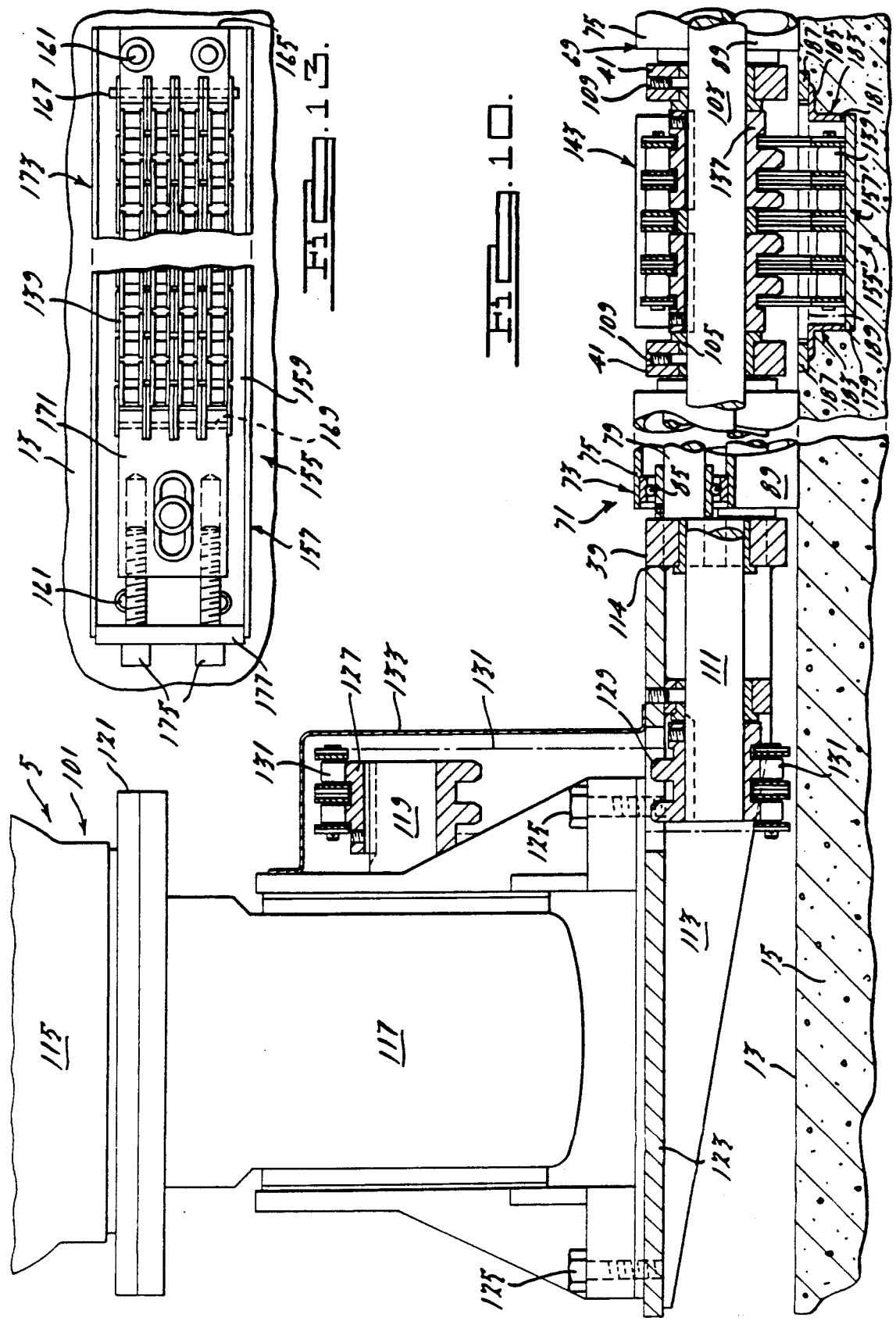

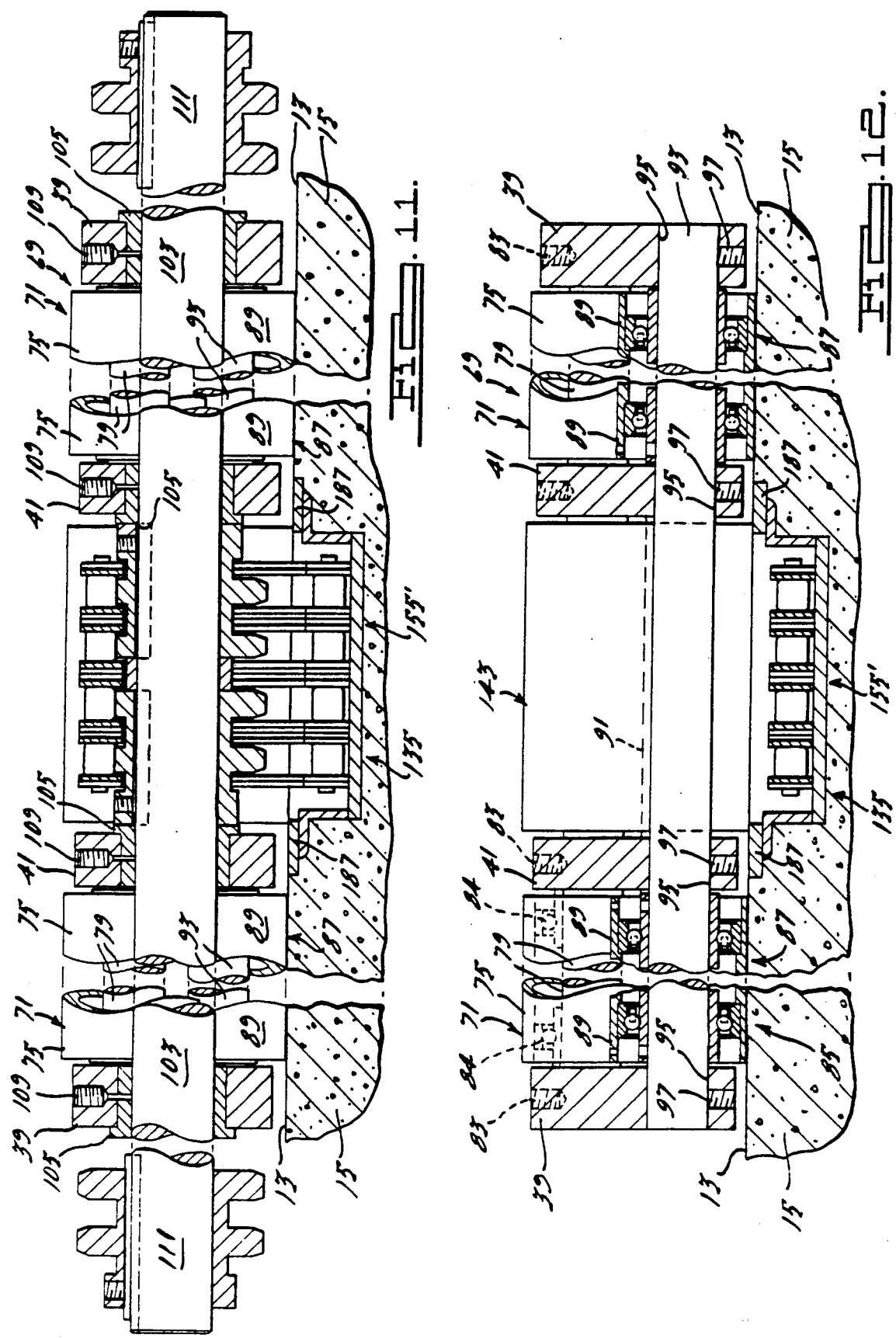

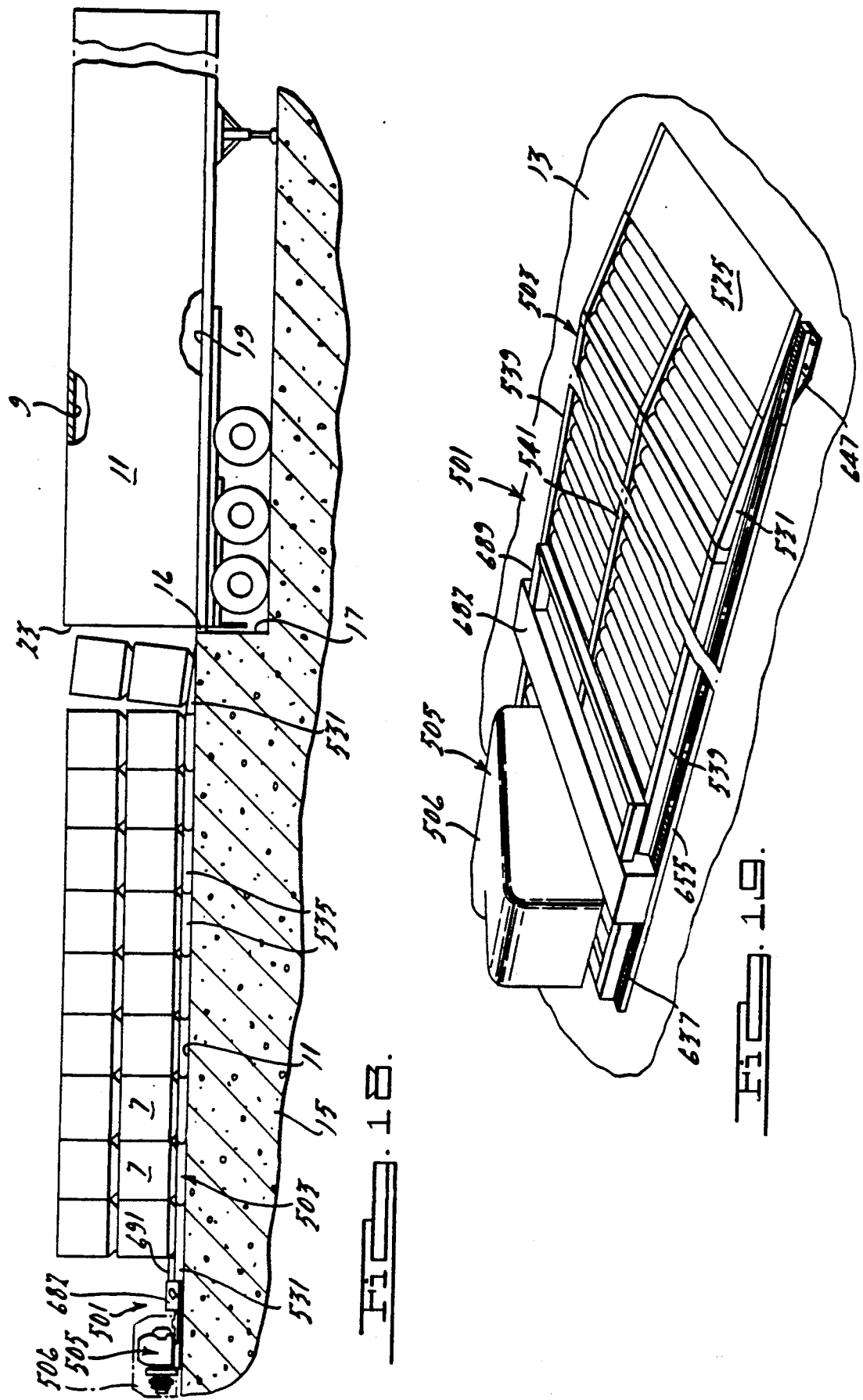

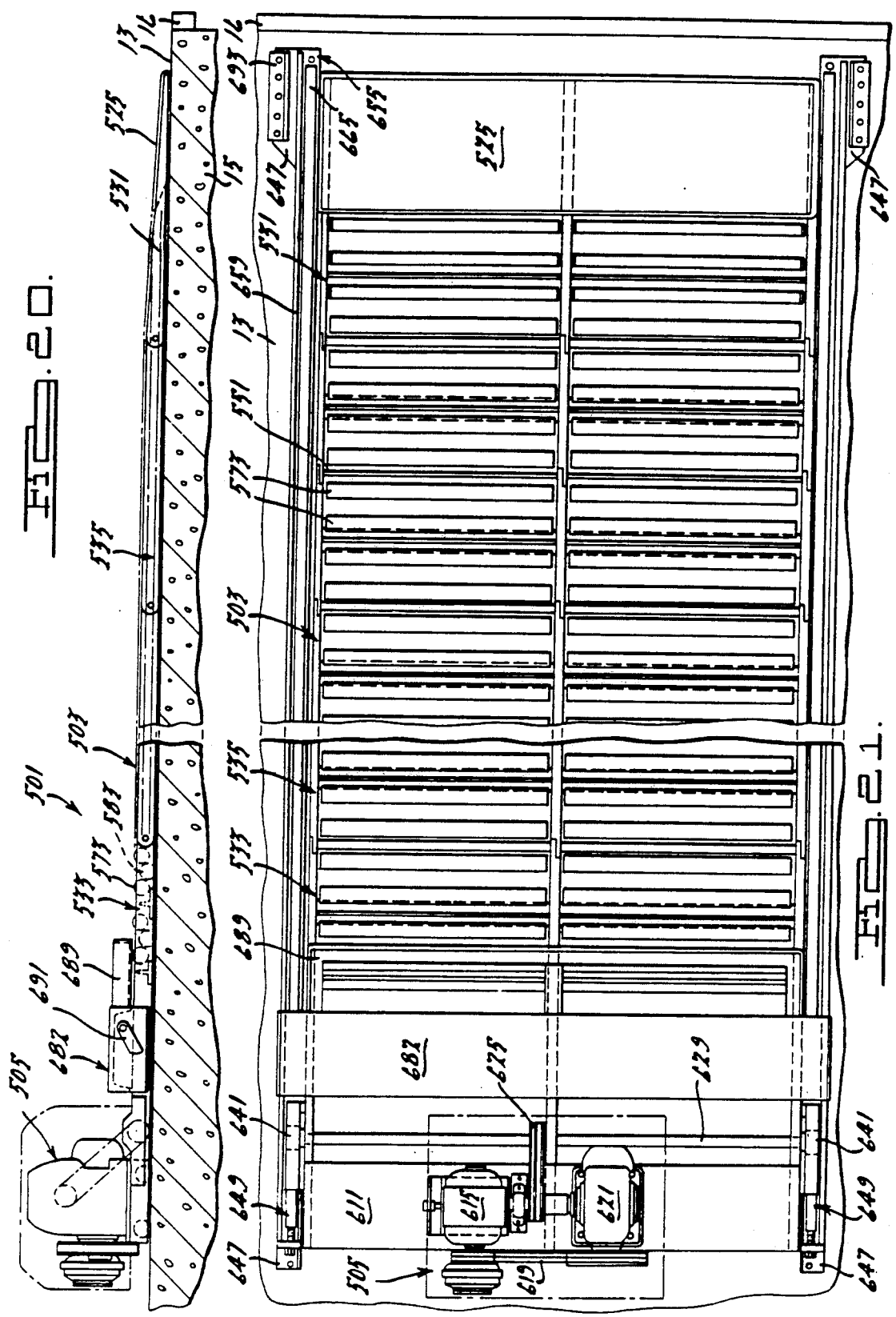

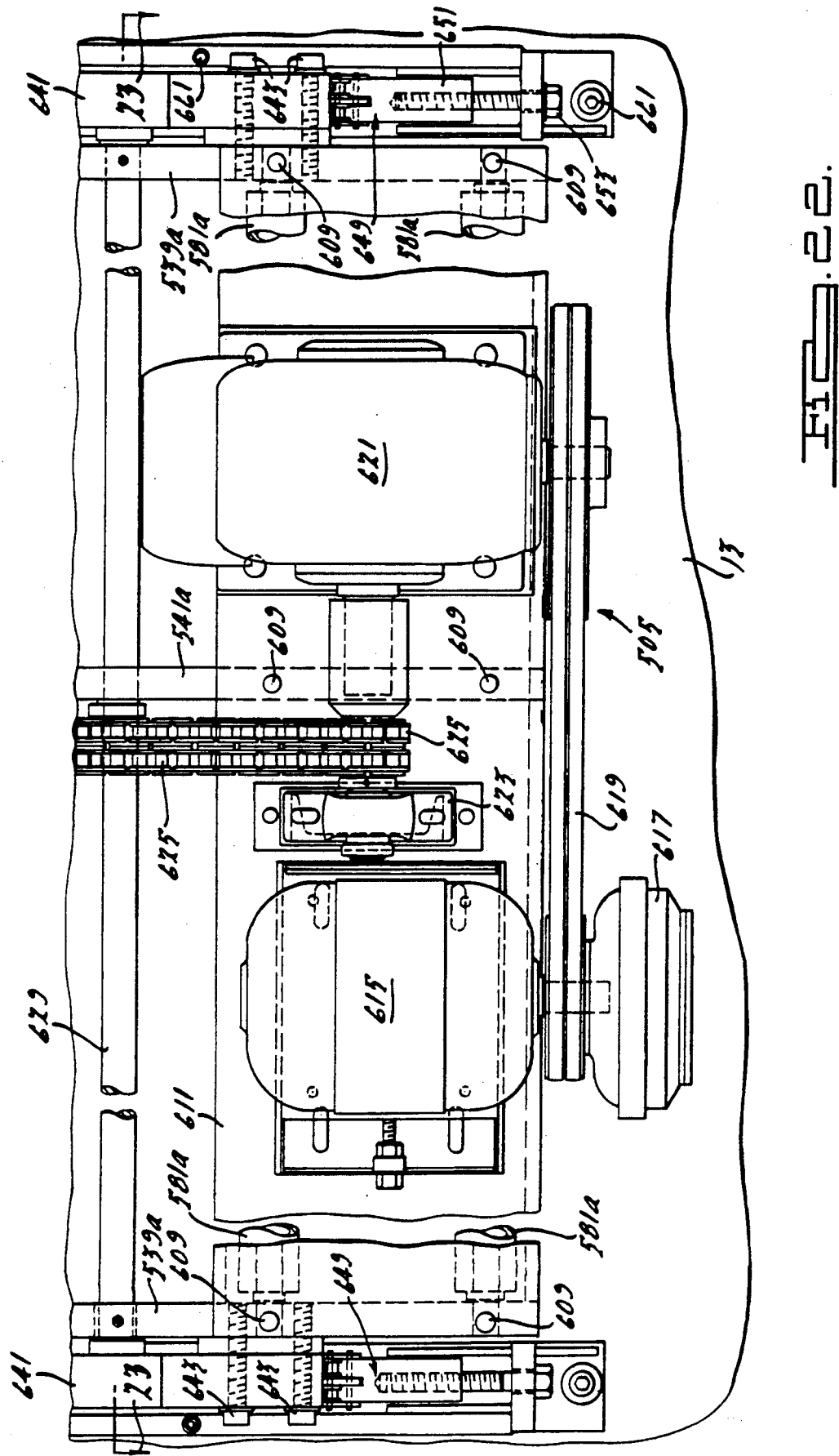

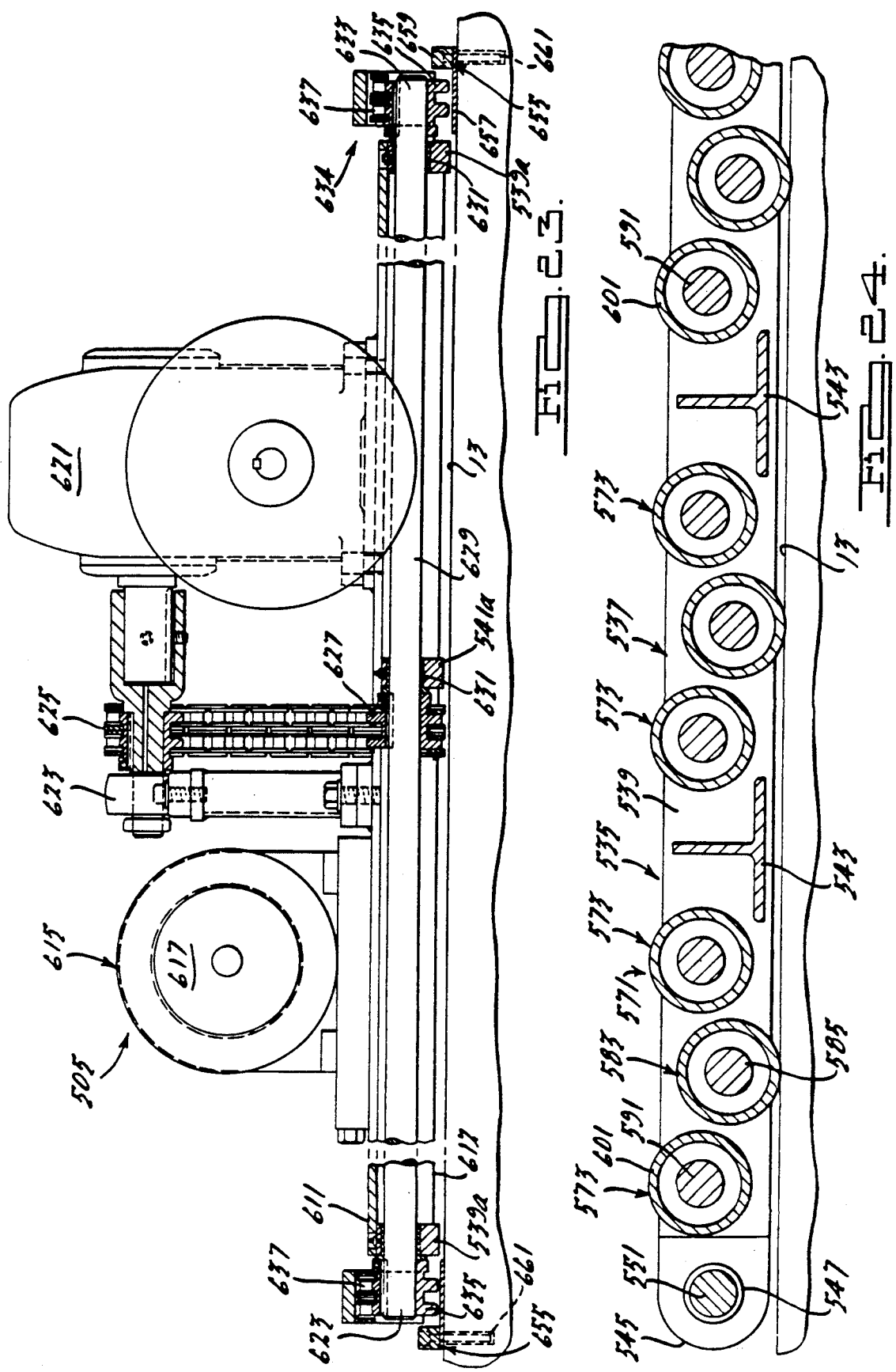

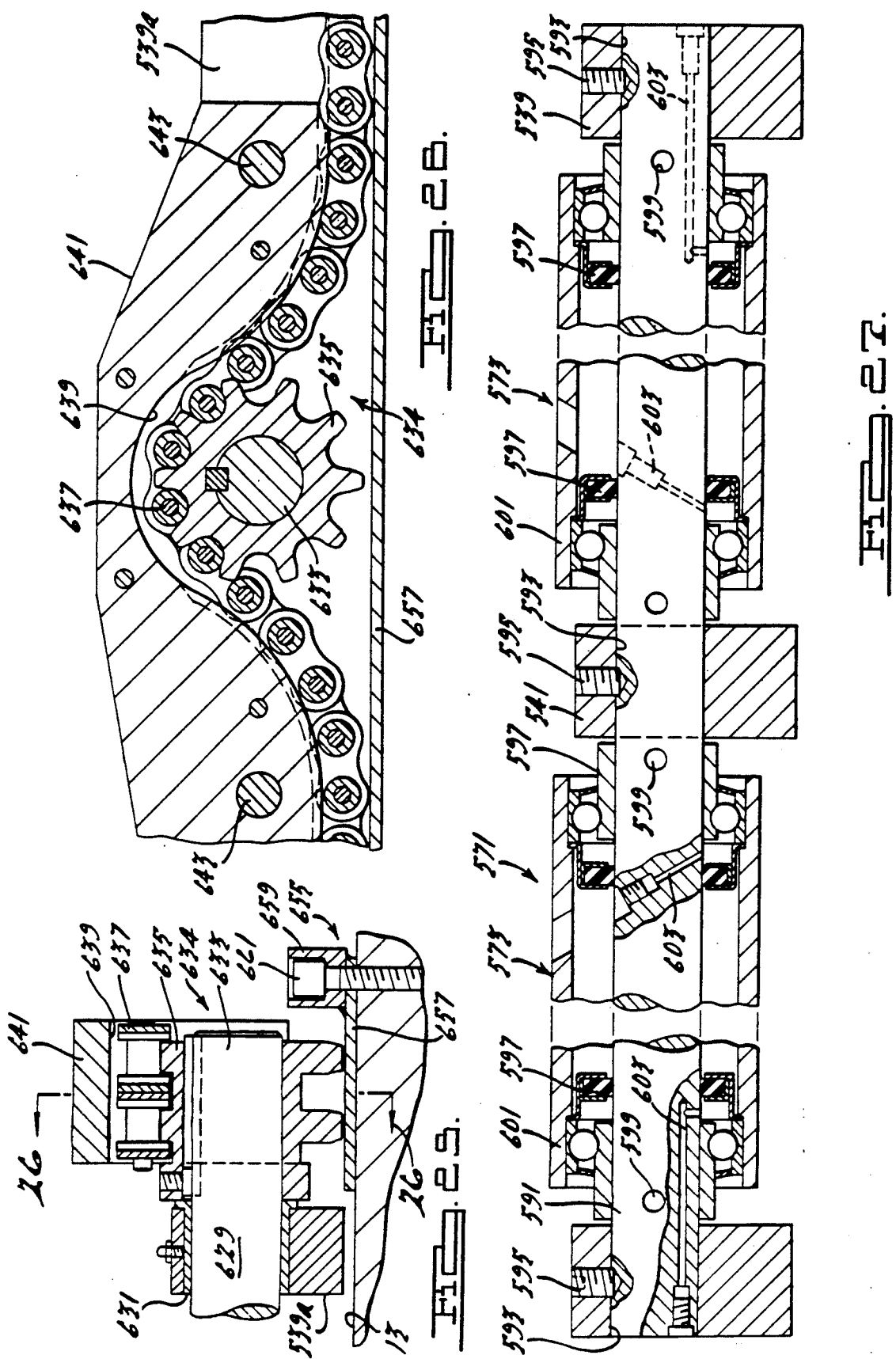

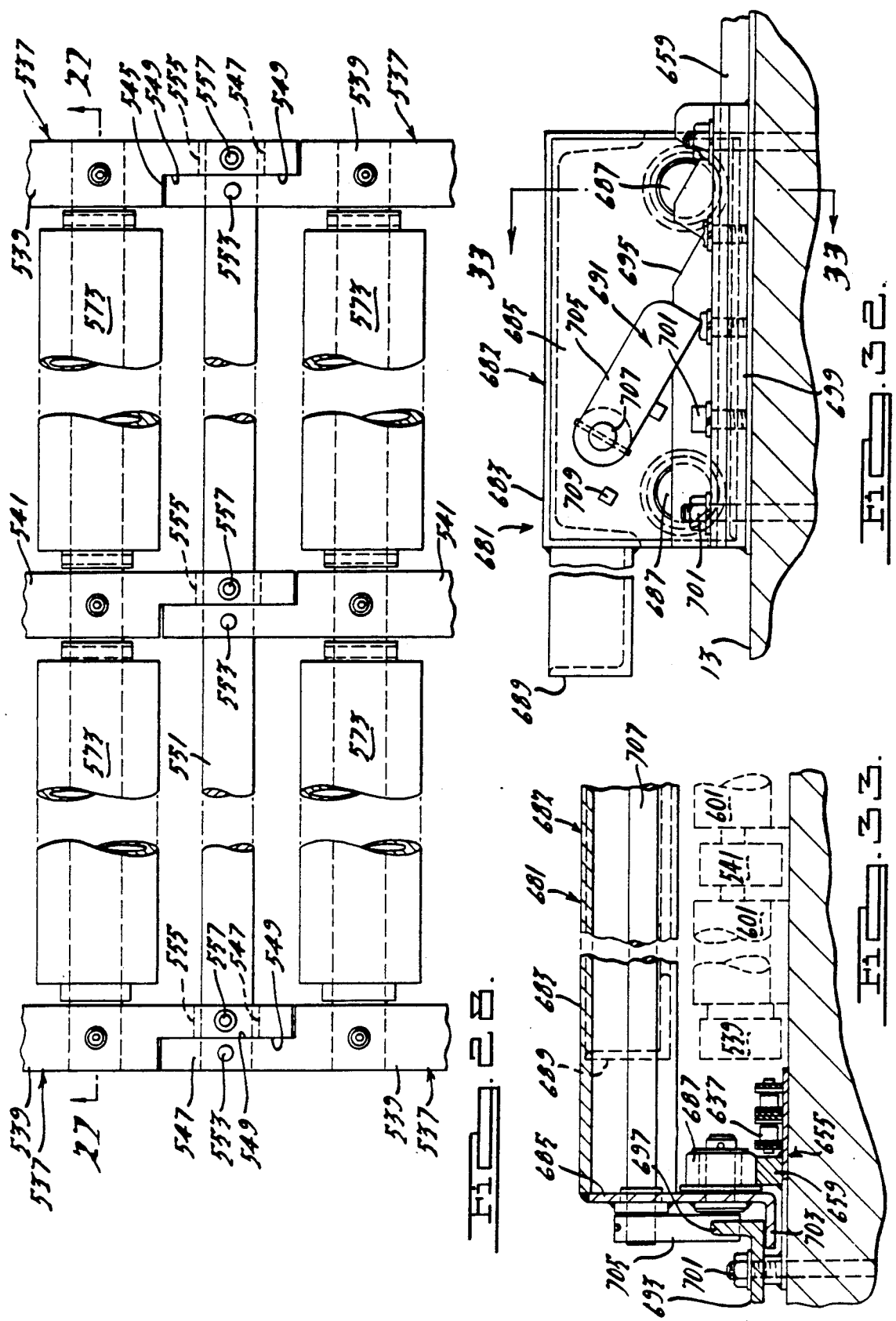

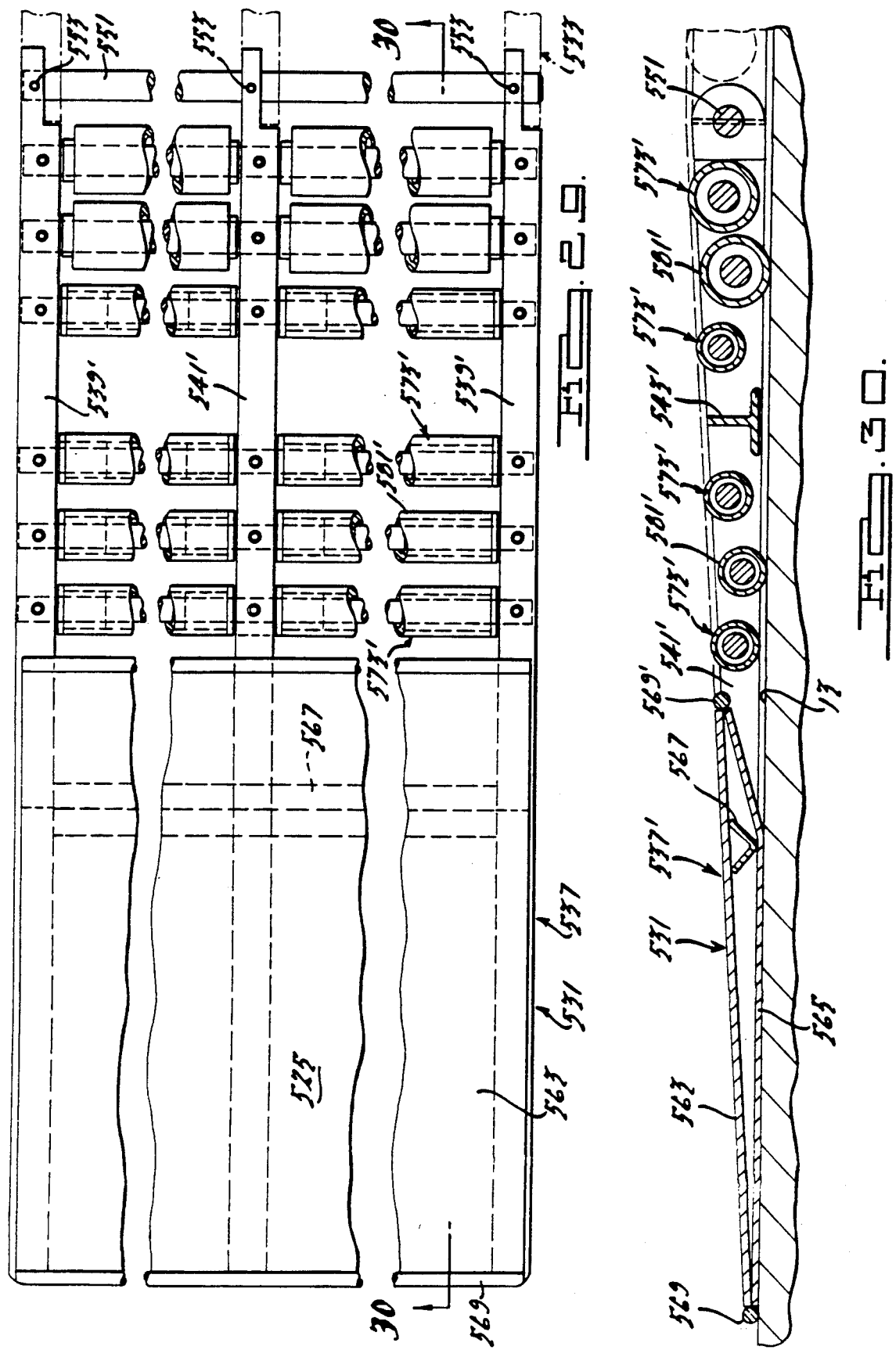

LOAD TRANSFER DEVICE

This is a continuation of U.S. patent application Ser. No. 06/738,972, filed May 29, 1985, now abandoned.

This invention relates to load transfer devices for rapid handling of freight or the like.

In the past it has been proposed to use freight handling apparatus of a type that would completely load or unload the interior of a highway freight carrier trailer at one time. A prior art apparatus designed to accomplish this is shown in U.S. Pat. No. 3,952,887, issued Apr. 27, 1976. The patent states that it is less complicated and less expensive than previously proposed devices for the same purpose. However, even the apparatus of this patent, suggests (1) that the floor of the loading dock be substantially modified by the addition of a permanent base framework with an intermittently operated hydraulic cylinder drive means and (2) that the floor of the trailer preferably be substantially modified by the addition of permanent longitudinal load supporting beams in order to space the load above the floor.

As will be seen, the load transfer device of the present invention is significantly simpler than the apparatus of the patent referred to, requires only minimal modification, if any, to the dock floor and none to the floor of the trailer, and yet has at least equal, if not greater, freight handling capacity and speed of operation.

BRIEF SUMMARY OF THE INVENTION

A load transfer device according to a preferred form of the invention comprises a long, low profile, vertically flexible, load support and transfer member with a tapered-to-the-floor platen at the front end to slip under loads on the floor. The load transfer member, which is of load length, has a series of upper rollers or the equivalent to form a load supporting deck means with low frictional resistance to movement of the load lengthwise of the member. The load transfer member also has a series of lower rollers or the equivalent that easily move across conventional floors found in environments of use for the device.

Power means, which is preferably an integral part of the long, flexible load support and transfer member, provides power to steadily and smoothly move the member in either longitudinal direction. In a presently preferred embodiment of the invention, the power means comprises a pair of reversible electric power units that are mounted on opposite sides of the rear of the flexible member out of the way of the deck means. They operate a common drive shaft located on the flexible member below the deck means to provide torque to operate a suitable drive means. In the preferred embodiment, the drive means includes a vertically flexible but longitudinally stationary roller chain anchored at opposite ends to the floor and extending along the longitudinal centerline of the load transfer member for the full length of the member and below it. The drive shaft has a sprocket at its mid-section that is meshed with the drive chain so that rotation of the shaft is converted into longitudinal movement of the member. Other embodiments of the invention are described hereinafter.

Thus, it is a purpose of the invention to provide a relatively simple load transfer device that enables a large load of freight articles to be rapidly moved in one trip from one place to another.

It is also a purpose of the invention to provide a relatively simple, mobile, load/unload device that may be used on a loading dock or in a vehicle without any expensive modifications or requirements for either.

It is also a purpose of the invention to provide a relatively simple and effective load transfer device for rapid loading and unloading of unitized loads on pallets, slipsheets, skids, racks, containers, in bins, etc., to and from either dedicated or non-dedicated vehicles and which can be adapted for automatic indexing or accumulating in conjunction with automatic transfer, to interface with a powered conveyor, overhead carrier system, and automated guide vehicle, as well as for loading or unloading by fork lift truck, manually, etc.

More details of the embodiments of the invention, as well as certain objectives and advantages, will become apparent upon consideration of the drawings and the detailed description set forth hereinafter.

DESCRIPTION OF THE DRAWINGS

FIG. 1 is a simplified, schematic, side elevation of a load transfer device embodying the invention showing it on a freight transfer dock supporting many elements of freight and in position to load the freight into a truck trailer body which is backed up against the end of the dock;

FIG. 2 is a view similar to that of FIG. 1 but showing the device removed from the trailer and on the dock after it has loaded the freight into the trailer and is again ready to receive another load of freight;

FIG. 4 is a side elevation of the device shown in FIG. 3 and with a broken away part of the dock shown in section;

FIG. 5 is a somewhat schematic perspective view of the type of device of FIGS. 1-4 showing it in the process of loading or unloading a highway vehicle trailer body, the inner rollers being omitted in the structure shown;

FIG. 6 is a top plan view of a broken away portion of the flexible load support and transfer member showing among other features the articulated or hinged connection between adjacent portions of the member (specifically between the rear section and an adjacent intermediate section) which provides for vertical flexibility but resists lateral or transverse flexibility in order to provide lateral stability;

FIG. 7 is a cross section along the line 7—7 of FIG. 6 and shows the round transverse hinge shaft as well as the sidebars;

FIG. 8 is a detail plan view of one of the side bars of the flexible load transfer member and specifically shows an inner side bar for the rear section;

FIG. 9 is a side elevation of the side bar of FIG. 8;

FIG. 10 is a vertical half section along the line 10—10 of FIG. 3 but modified to show a portion of an upper roller of the flexible load transfer member;

FIG. 11 is a vertical section through the drive shaft as mounted on the rear section of the flexible load transfer member and is basically similar to the drive shaft section of FIG. 10 but is a full width section, partly broken away;

FIG. 12 is a vertical section somewhat similar to FIG. 11 but taken through the floor roller support shaft adjacent to the drive shaft;

FIG. 13 is a plan view, broken away, of floor mounted stationary chain assembly;

FIG. 18 is a simplified side elevation of another modification showing it ready to transfer a load into a trailer or having just removed a load from a trailer;

FIG. 19 is a perspective view, broken away, of the modified form of load support and transfer device shown in FIG. 18;

FIG. 20 is an enlarged side elevation, broken away, of the modification shown in FIGS. 18 and 19;

FIG. 21 is a plan view of the structure of FIG. 20;

FIG. 22 is an enlarged top plan view of the rear section of the device of FIGS. 18–21 showing the power means and a part of the drive means;

FIG. 23 is a section along the line 23—23 of FIG. 22;

FIG. 24 is an enlarged longitudinal cross section, broken away, of a section of the flexible load support and transfer member used in the modification of FIGS. 18–23;

FIG. 25 is an enlarged view of the chain drive structure at the right of FIG. 23;

FIG. 26 is a cross section along the line 26—26 of FIG. 25;

FIG. 27 is an enlarged cross section along the line 27—27 of FIG. 28;

FIG. 28 is a top plan view of a broken away portion of the flexible load support and transfer member showing the hinged connection between adjacent sections;

FIG. 29 is an enlarged, top plan view, broken away, (and reversed 180° from FIGS. 18–21) of the front section of the flexible load support and transfer member;

FIG. 30 is a cross section along the line 30—30 of FIG. 29;

FIG. 32 is a side elevation as if taken from the top of FIG. 31 but showing the restraint means moved to operative position; and FIG. 33 is a cross section, broken away, along the line 33—33 of FIG. 32 with a part of the load support and transfer member (which is on the opposite side of the plane of the section) being shown in phantom lines.

DESCRIPTION OF THE INVENTION

Figure 3:
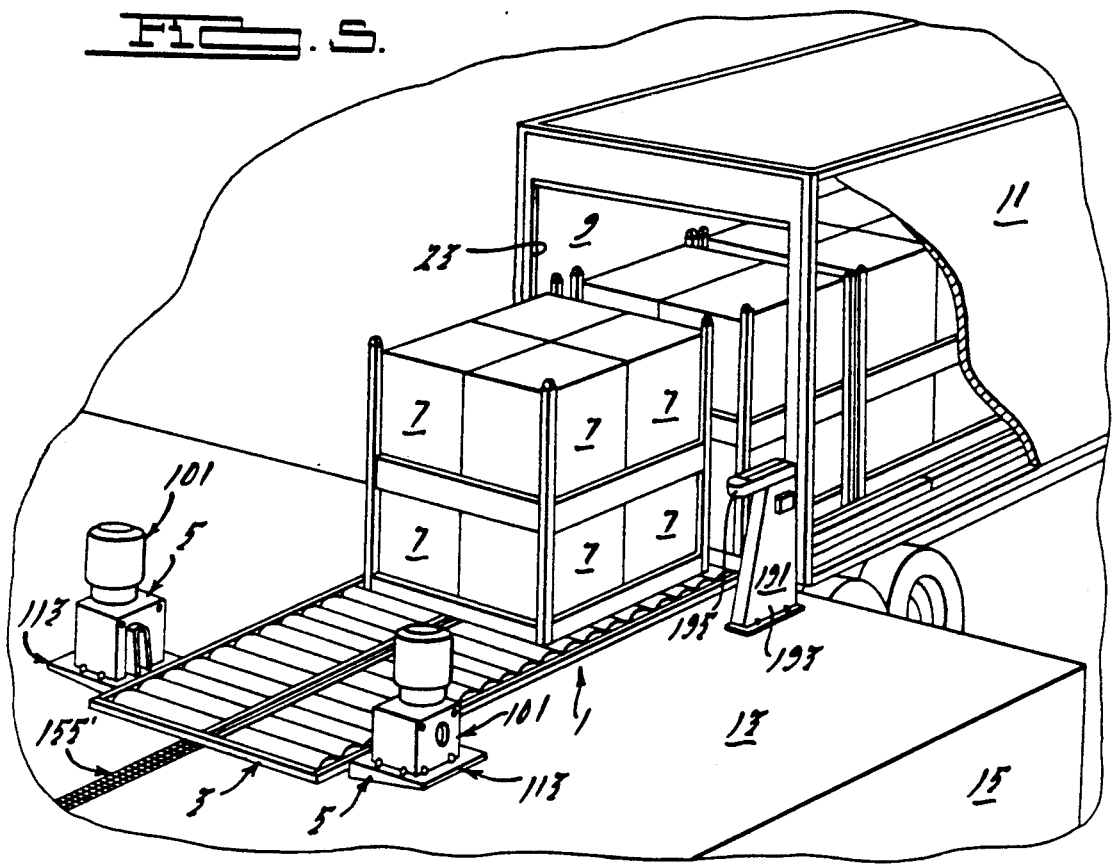
FIG. 3 is an enlarged top plan view of the device shown in FIG. 2, partly broken away, and shows that the device is able to be end loaded or unloaded and can be adapted for automatic indexing or accumulating in conjunction with an automatic transfer to interface with a powered conveyor, overhead carrier system, or automated guide vehicle, etc.

Referring first to FIGS. 1–4, a low profile freight transfer device 1 according to a presently preferred embodiment of the invention comprises (a) a vertically thin, flexible, mat-like, horizontally long, freight load supporting and transfer member 3 which is longitudinally and horizontally movable on and across a floor, (b) a power means 5 to provide power and torque for longitudinally and horizontally driving and steadily and smoothly moving the load support and transfer member 3 and which is mounted on the outside of the rear end of the member 3 and movable as a unit with it, and (c) a drive means (to be described later) housed in member 3 to convert torque supplied by the power means into slow, smooth, steady, continuous, linear movement of member 3.

In FIGS. 1 and 2 is illustrated the use of the freight transfer device 1 to rapidly load and/or unload a load of freight elements 7 into and/or out of a freight storage compartment 9 inside of a highway vehicle or truck trailer body 11.

The member 3 rides on a conventional floor surface 13 of a conventional loading/unloading dock 15. The trailer 11 is shown backed against a bumper rail 16 on the vertical end 17 of the dock so that the floor 19 of its storage compartment 9 is substantially flush with the dock floor 13. If needed, a conventional load transfer plate (not shown) may be used to bridge any gap or misalignment that may exist between floor 19 and floor 13. The load support and transfer member 3 is preferably of a length and width comparable to that of storage compartment 9 so that it can carry a full freight load into and/or out of the trailer 11.

In the trailer loading mode of operation of device 1, the freight elements 7 (such as containers, pallets, skids, racks, slipsheets, etc.) may be loaded or pre-staged on load support and transfer member 3 by hand, fork lift, crane, powered conveyor unit, automated means, etc. in a cubic configuration or envelope to suit the internal dimensions of compartment 9. Power means 5 is energized and the transfer device 1 is driven into the compartment 9 with the member 3 riding on the dock floor 13 and on the trailer compartment floor 19. When the load is completely inside the trailer 11, a suitable load blocking or restraint means (referred to hereinafter) may be actuated to hold the load in the trailer and the power means 5 is reversed whereupon the mat-like load support and transfer member 3 is slipped out from underneath the load and returned to a freight receiving position on the dock 15 (FIG. 2).

In the unloading mode, the power means 5 of the empty device 1 (FIG. 2) is energized to cause the member 3 to ride across the floor 13 and into the trailer 11 through its open end 23. The member 3 has as its front section a thin, plate-like, tapered-down-to-the-floor platen 25, with a chisel-like leading edge, and this is driven easily beneath the freight elements 7 (though a slip sheet may be desirable beneath some loads) until it reaches the desired longitudinal position, usually at the front of the compartment 9. As indicated, the load support and transfer member 3 is preferably of substantially the same width as the trailer compartment 9 (usually about 90") so that when the platen 25 reaches the front of the compartment, the entire freight load in the trailer will be supported on member 3. The power means 5 can then be energized in reverse to remove the device 1 with the full load from the trailer and support it on the dock 15 (FIG. 1). At this point the freight elements 7 can be taken from the device 1 by any desired means. Thus, it is seen that the entire trailer is completely unloaded in one in-and-out cycle.

The device 1 is preferably designed for steady, continuous, smooth, linear travel at a rate of about 25 feet/minute. For the usual trailer compartment length (about 48 feet), a complete loading or unloading cycle will therefore take only about 4 minutes. It is anticipated that the device can have, for example, a nominal load capacity of about 60,000 lbs. which it can transfer in the 4 minute cycle.

Referring now to more details of the flexible freight load support and transfer member 3, it comprises a front section 31 (FIGS. 2-4) containing the platen 25, a rear section 33 which supports and carries the power means 5, and a series of substantially identical intermediate sections 35 located between the front and rear sections 31 and 33. The number of intermediate sections used is dependent upon the length of the load which the device 1 is intended to handle. For example, if it is desired to transfer freight into and out of a 48 ft. trailer and assuming that each of the sections 31 and 35 has an effective length of 4 ft., as is preferred, there would be 10 sections 35 along with a 4 ft. front section 31. The rear section 33, carrying power means 5, may be somewhat longer, for example 7 ft, making the overall length of member 3 about 51 ft. As previously indicated, the width of sections 31, 33 and 35 would be identical and would correspond to the width of the trailer, i.e., about 90 inches.

The sections 31, 33, and 35 comprise rigid frames 37 which are hinged together (at preferably 48 inch intervals for the example just mentioned) along transverse axes to provide the transfer member 3 with vertical flexibility. The hinge connections are preferably of a kind to provide stability in a lateral or transverse direction so that the sections 31, 33, and 35 remain in straight, longitudinal alignment during operation of the device 1. However, the hinge connections will also permit some relative vertical movement and enable the member 3 to ride over irregularities on the floor without substantially disturbing a load being transferred.

Referring to FIGS. 6-10 which show rear section 33 hinged to adjacent intermediate section 35, the frame 37 of each section comprises a pair of outer longitudinal sidebars 39 and a pair of inner longitudinal side bars 41. In order to provide for slight overlap with lateral stability and hinging together, the extreme ends of the sidebars 39 and 41 for one section, where they are hinged to adjacent sidebars of another section, are reduced to about half width by offsets or cutouts 43 which at the front ends of the sidebars are on the sides facing away from the centerline of the member 3 and at the rear ends of the sidebars are on the sides facing toward the centerline of the member 3; except for the extreme ends of the sidebars in the front and rear sections 31 and 33 which, not being hinged, do not need the offsets or cutouts 43.

Each hinged connection 45 between adjacent sections includes a round, transverse, non-rotary hinge shaft 47 that extends through aligned openings in the overlapping offsets 43. The offsets 43 at the front ends of the sidebars have enlarged openings 48 (FIG. 9) to receive bushings 49 that may be lubricated by means of suitable fittings 51 in the sidebars. The offsets 43 at the rear ends of the sidebars have openings 53 of substantially the same diameter as the steel hinge shaft 47. The shaft 47 extends through and fits the walls of openings 53 as well as the inner peripheries of the bushings 49. While angular movement between the bushings 49 and shaft 47 can occur, it is prevented with respect to openings 53 by means of cross pins 55 that extend through aligned cross pin receiving apertures 57 in the rear ends of the sidebars and in the shaft 47. The cross pins 55 also hold the shaft 47 in fixed axial position and allow it to act as a load carrying member interconnecting the sidebars to provide lateral rigidity to the rear ends of the frame 37 to which it is affixed.

As mentioned above and as indicated in FIGS. 1 to 4, the rear section 33 is illustrated as longer than the intermediate sections 35. As shown in FIG. 6, rigidity at the extreme rear end of this section may be provided by cross plates 59 welded to the ends of the inner and outer sidebars. The front section 31 may be of the same length as intermediate sections 35 and has a frame 37' (FIG. 4) that is the same in principle and construction, though the sidebars are tapered down along their lengths to very small radius. The tapered platen 25 extends over about one half of the length of section 31 and comprises upper and lower steel plates 61 and 63 welded to the side bars and reinforced by cross braces 65 welded to all of them. A $\frac{1}{8}$" diameter cross bar 67 may be welded to the front ends of plates 61 and 63 to form a chisel-like leading edge at floor level for the platen 25 and the load support and transfer member 3.

The load transfer member 3 is provided with a low friction deck means 69 on its top, specifically shown as a roller means 71, so that relative longitudinal movement between the top of the member 3 and the bottoms of the freight articles may occur easily and with little force. The roller means 71 comprises a series of roller subassemblies 73 that are supported in frames 37 (and 37') at, preferably 6 inch intervals along the entire length of the member 3 from its rear edge 59 to the front platen 25. Thus, for the 48 ft. trailer example, each intermediate section 3 would preferably have eight roller subassemblies, front section 31 would have four, and rear section 33 would have seven. Each subassembly comprises tubular outer rollers 75 extending between the outer sidebars 39 and the adjacent inner sidebars 41 and a tubular inner roller 77 extending between the inner sidebars 41. The subassembly 73 also includes a common, fixed, support shaft 79 supported in openings 81 in the sidebars, being held there by screw means 83, and ball bearing sets or the like 84 (FIG. 10 and 12) at each end of each tubular roller whereby it is rotatably mounted on the shaft 79. For the example mentioned, the rollers may be about $2\frac{3}{4}$" O.D. and openings 81 located so that the rollers project about $\frac{1}{4}$" above the plane of the tops of the sidebars. The inner rollers 77 may be omitted from subassemblies 73 at the extreme rear of section 33 to provide space for a chain drive mechanism to be described hereinafter.

Figure 15:
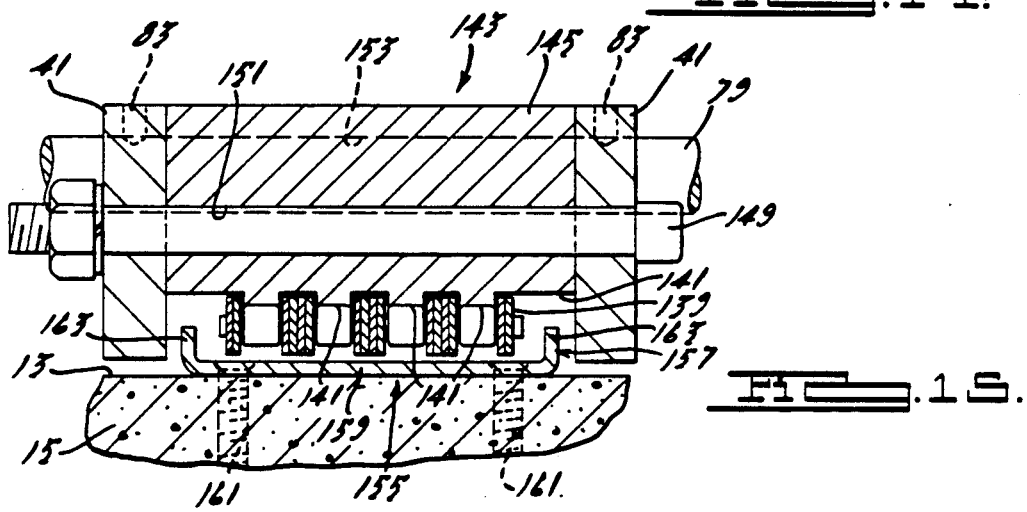
FIG. 15 is a vertical section along line 15—15 of FIG. 14.

The load transfer member 3 is provided with a low friction means on its bottom so that it can move easily back and forth across the dock floor 13 and the floor 19 of the storage compartment 9. This is illustrated as a roller means 85 comprising roller subassemblies 87 that are substantially the same as freight deck roller subassemblies 73. However, floor roller subassemblies 87 are spaced apart by preferably 12 inch intervals along the entire length of the member 3 from its rear edge 59 to the front platen 25. Thus, each intermediate section 35 preferably has four subassemblies, front section 31 has two, and rear section 33 has six or seven for the example discussed above. Each subassembly 87 comprises tubular outer rollers 89 extending between the outer sidebars 39 and the adjacent inner sidebars 41 and a tubular inner roller 91 extending between the inner sidebars 41. The subassembly 87 also includes a common fixed, support shaft 93 supported in openings 95 in the sidebars, being held there by screw means 97, and ball bearing sets or the like 99 at each end of each tubular roller whereby it is rotatably mounted on the shaft 93. Like those of subassembly 73, the rollers 89 may be about 2¾" O.D. and openings 95 located so that the rollers project about ¼" below the plane of the bottoms of the sidebars, i.e., the frames 37 forming sections 31, 33, and 35. The inner rollers 91 may be omitted from the subassemblies in the event a floor mounted chain drive mounting (as shown in FIG. 15) is used or may be made smaller in diameter so that they can ride on tops of the side flanges of the mounting. The roller shafts 79 and 93 provide transverse support for the sidebars. Additional cross braces (not shown) may be affixed between them if needed or desired. It is believed that the long lengths of engagement of the long rollers 89 with the floor 13 will contribute to the stability of member 3 and minimize the strength requirements for the frames 37.

Referring to the power means 5, which is supported on, carried by, and movable with the rear section 33 of flexible load transfer member 3, it comprises a pair of substantially identical reversible power units 101 which are appropriately cross connected to operate together to rotate a common transverse drive shaft 103 at a selected torque and speed. The shaft is rotatably supported in bushings 105 that are mounted in openings 107 in the sidebars 39 and 41 on their centerlines. The bushings 105 may be held in place and the joints lubricated by suitable fitting means 109 in tops of the sidebars. The shaft 103 is longer than the width of the rear section 35 and member 3 so that opposite end portions 111 project transversely outwardly beyond the outer side faces of the outer sidebars 41.

Each power unit 101 is mounted on a sturdy bracket means 113 that is rigidly affixed, as by welding, to the outer sidebars 39 of the rear section 33 at the rear end thereof as seen at 114 (FIG. 10). The bracket means 113 project transversely outwardly as cantilever power unit supports from opposite sides of the flexible load transfer member 3 and are spaced above the floor 13. The illustrated power units 101 each comprise a vertical shaft electric motor 115, each preferably 5 horsepower for the example discussed, mounted on and driving a speed reducer 117 having a horizontal, transverse output shaft 119 driven at, preferably, a torque of about 6200 lb. in. for the example discussed. Each motor 115 may be rigidly mounted by way of flange joint 121 on the top of its reducer 117 and the reducer may be mounted on and bolted to the horizontal shelf 123 as seen at 125. Roller chain sprockets 127 and 129 are affixed, respectively, on the end of each reducer output shaft 119 and the adjacent end 111 of the drive shaft 103 and a roller chain 131 is trained over them whereby drive torque is delivered by the two power units 101 simultaneously to opposite ends of the drive shaft. A suitable cover shield 133 may be fastened in place over the moving parts, i.e., the sprockets and chain 131.

It is evident (FIGS. 3-5) that the power units 101 are spaced apart by more than the width of a freight load and permit end loading as well as full utilization of a freight carrying cubic envelope whose bottom is defined by the entire area of load transfer member 3.

As just indicated, the power means 5 operates the drive shaft 103 at a desired torque and speed. The drive shaft is connected to and operates a drive means 135 which converts rotation of the drive shaft 103 in either direction into back-and-forth linear movement of the load transfer member 3. The drive means 135 includes a chain drive sprocket means 137 (FIGS. 10-16) that is fixedly mounted on a center portion of drive shaft 103 between the inner sidebars 41. The drive means 135 also includes a long, stationary, roller chain 139 which is trained over the top of sprocket 137 and guided to remain in mesh with it over a selected arc by the special, curved, inner channel-shaped guide surfaces 141 of the guide block means 143 comprising front and rear guide block members 145 and 147, respectively. Each block 145 and 147 fits between and is bolted to the two inner sidebars 41 by means of bolt and nut means 149 (FIGS. 6, 14-16) extending through aligned holes 151 in the blocks and sidebars. The tops of the guide blocks are preferably flush with or no higher than the tops of sidebars 41 (FIG. 14) and no lower than the top of chain 139. A thin cover plate (not shown) can be fastened over the internal parts in the gap between the two blocks, if desired; it being noted that the chain drive is protected by the inner sidebars and member 3. The blocks 145 and 147 also contain transverse holes 153 so that shafts 79 of deck roller subassemblies 73 can extend through the blocks and furnish support for them.

Figure 14:
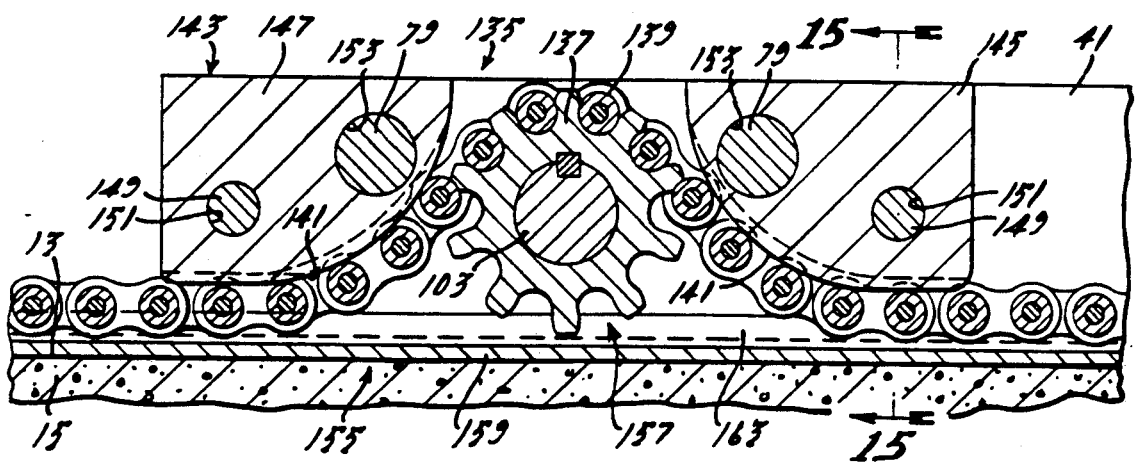
FIG. 14 is a vertical section along line 14—14 of FIG. 6 showing a floor surface mounted chain drive structure.
Figure 16:
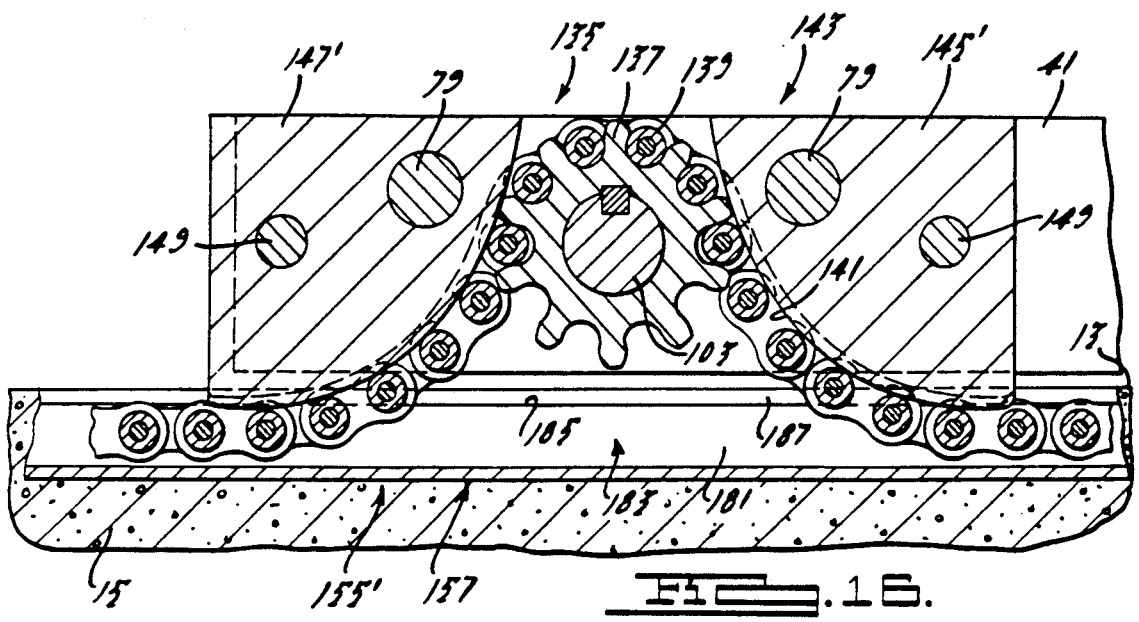
FIG. 16 is a vertical section similar to FIG. 14 but showing a flush mounted chain drive structure in a floor recess corresponding to that of FIGS. 10–12.

The chain 139, which extends along the centerline of member 3, may be mounted on the surface of floor 13 (FIGS. 13-15) or in a relatively shallow longitudinal recess in the floor, i.e., "flush" mounted, (FIGS. 10-12 and 16). In the case of flush mounting, the guide block means 143 has guide blocks 145' and 147' which, as seen by comparison of FIG. 16 and FIG. 14, are deeper than the blocks 145 and 147 used with the floor mounted chain and a somewhat greater arc of contact of chain and sprockets is therefore obtained. Otherwise guide blocks 145' and 147' are the same as blocks 145 and 147.

Referring to FIGS. 13-15, the surface mounted drive chain assembly 155 includes chain 139 and a long, shallow, channel-shaped trough or track 157 in which the chain lies. The bottom 159 of the track 157 is removably affixed on floor 13 by suitable bolts 161 attaching it to the dock 15. The longitudinally extending, vertical side flanges 163 of the track 157 fit with some lateral clearance and vertical overlap between the inner sidebars 41 and therefore are capable of guiding movement of the member 3 in a path corresponding to the rectilinear nature of the track 157, though it is intended that the interconnection of sprocket means 137 with the multi-strand chain 139 (four strands being shown) will itself provide adequate guidance. Since the surface mounted chain assembly 155 would prevent contact of the inner floor rollers 91 with the floor 13, the rollers 91 are preferably omitted rather than decreased in diameter to ride on the top edges of flanges 163.

The drive chain track 157 is preferably a foot or so longer than the load transfer member and its front end 165 (FIG. 13) is located adjacent the end 17 of the dock. The chain 139 simply lies on the bottom wall 159 of the track throughout most of its length with its front end pivotally anchored to the track in fixed longitudinal position as shown at 167. The rear end of the chain 139 is pivotally anchored at 169 to the front end of a block 171 of a longitudinally adjustable anchor and chain tensioning means 173 which includes bolts 175 threaded into the rear end of the block 171 and having heads bearing against the outside of the rear end 177 of the track. Adjustment of the longitudinal position of the block 171 by means of the bolts 175 adjusts the tension in the chain 139.

Referring to FIGS. 10–12 and 16, the flush mounted chain drive assembly 155' includes a shallow channel-shaped track 157' that is embedded in the concrete of the floor and dock and is formed by a flat bottom plate 179 welded to vertical legs 181 of angle bars 183 that have horizontally extending flanges 185 extending outwardly on the outer portions of which are welded shim strips 187 that have top faces flush with the floor surface 13 so that they, in effect, become a part of the floor. When the device 1 is not in use, cover plates 189 (shown in phantom in FIG. 10) can be laid on the flanges 185 between the shim strips 187 to cover up the track 157' and form a part of the floor surface 13. In use of the device 1, the outer ends of the inner floor rollers 91 (FIGS. 11 and 12) can engage the tops of shims 187 and roll back and forth on them as well as a part of floor 13. The chain 139 is mounted in the track 157' in the same manner as discussed in connection with chain drive assembly 155 so that it is anchored at the front and rear ends and adjustments can be made of its tension.

In operation, and assuming that the load transfer device 1 is in the loaded position of FIG. 1, the two electric motors 115, which are electrically interconnected to work together, are energized to rotate the drive shaft 103 in a counter-clockwise direction as seen in FIGS. 4, 14, and 16. Since the chain 139 is stationary, rotation of the shaft 103 and its sprocket means 137 will cause it to pull itself forward (to the right in FIGS. 1 and 4) along the chain as it rotates, putting the chain in tension on its front anchor 167. Since the shaft 103 and guide block means 143 are integral parts of the load transfer member 3, their movement relative to the chain 139 will pull the entire member 3 forward along with the freight load supported by it. The member will continue slow, smooth, steady linear movement, preferably at a rate of about 25 feet per minute, until the motors 115 are deenergized, or an obstacle such as the end of the chain assembly 155 or 155' is encountered. Thus, the operator can allow the loaded member 3 to roll across the floor 13, into the compartment 9, and along truck floor 19 until the load is entirely within the compartment. An electrical accommodation, such as a long electrical extension cable and cable reel or the like (not shown), for supplying electrical current to the motors will, of course, be employed to enable the motors to be energized even though they move from the position of FIG. 1 to a position adjacent the end of the dock 15 when the member 3 is substantially fully inside of the truck.

To facilitate removal of the member 3 from underneath the freight load inside the truck, just described, it may be desirable to have a load blocking or restraint means 191 (FIG. 5) to engage rear faces of the load in the truck. The restraint means 191 can be of various constructions and the one illustrated comprises stands 193 on each side of the member 3 at the end of dock 15, each having a pivotal cantilever arm 195 which can be rotated at least 90° to extend parallel to the member 3 when it is not operative or perpendicular to it across opening 23 when it is operative. It can be operated manually or automatically when it is desired to slip the member 3 out from underneath the load in the truck 11.

In removing the member 3, the direction of rotation of the drive motors 115 is reversed so that the drive shaft 103 rotates in a clockwise direction, as seen in FIGS. 4, 14, and 16, to put the chain 139 in tension on its rear anchor 169 and pull itself and attached member 3 to the rear. Since the member 3 is thin (preferably about 4½" overall height in the example discussed) and since the roller means 71 provides minimal resistance to relative longitudinal motion of the member 3 and freight units 7, the member 3 can easily be withdrawn from the truck 11 until it is returned empty to its original position. The load restraint means 191, if utilized, can then be deactivated so that arm 195 returns to its non-operating position of FIG. 5.

Referring to FIG. 2, and assuming that the device 1 is to be used to remove in one load all the freight articles 7 in the storage compartment of the trailer 11, the power means 5 is energized to move the member 3 to the right. The chisel-like point of the platen 25 and its small angle of taper (about a 4" rise over 48") enable it to slip beneath successive articles 7 of freight. It is noted that the rear half of the front section 31 of member 3 is provided with deck roller assemblies 71 (FIG. 4), the diameter of the rollers being reduced to correspond to the tapered height at their longitudinal position while still permitting them to project about ¼" above the sidebars 39 and 41. These deck rollers on front section 31 act in conjunction with the small taper of platen 25 to allow the front section 31 to be readily loaded. It is believed that the ease of loading section 31 along with slow, smooth, steady motion of member 3 will tend to keep compression in the member 3 to a minimum during the unloading mode of device 1 and to minimize buckling of the flexible member 3 at the hinges 45. Tension in the chain 139 acting down on the drive shaft 103 should also inhibit buckling. Positive resistance to buckling is provided by the squared ends 197 of the sidebars (FIGS. 4, 8 and 9) spaced slightly from but facing the parallel squared end faces or shoulders 199 of cutouts 43 (FIGS. 4, 8, and 9). Excessive compression in the member 3 could create a tendency for the member 3 to shorten itself which could be accommodated by pivoting at a hinge shaft 47 and lifting of the shaft. However, after only a small amount of lift (about 3" or so) the end faces 197 at the lifted shaft 47 and the adjacent shoulders 199 will come into contact to lock the hinge 45 against further pivoting or buckling.

The slow, smooth, steady, continuous linear motion of the members 3 is designed to minimize forces due to acceleration or inertia that might otherwise act on the freight articles and tend to cause their undesired longitudinal displacement on the member 3. As a consequence, the use of a load restraint means on the member 3 to block longitudinal load shifting is not thought to be necessary.

It will be seen that the load transfer device 1 provides means to improve overall productivity in transportation, storage, warehousing, distribution, or manufacturing systems by drastically reducing loading and unloading times as compared with conventional methods, normally fork lift trucks. No substantial modifications are required to the storage compartment (e.g., the tractor-trailer) or to the pre-stage load length area (e.g., the dock floor). The device 1 is designed for end loading or unloading and can be used for automatic indexing or accumulating in conjunction with an automatic transfer to interface with a powered conveyor, overhead carrier system or automated guided vehicle, etc. The stationary floor mounted chain assembly 155 can be quickly attached to or removed from the floor 13 if a permanent installation is not desired. On the other hand, the flush chain assembly 155' requires minimal, permanent floor modification and when not in use can be easily covered over by plates 189 to allow normal use of the dock floor 13. In the system illustrated, no modifications at all are required for the storage compartment 9. It will be apparent, however, that the arrangement could, if desired, be reversed so that the device 1 is installed on the floor 19 of the storage compartment rather than on the floor 13 of the dock.

Figure 17A:
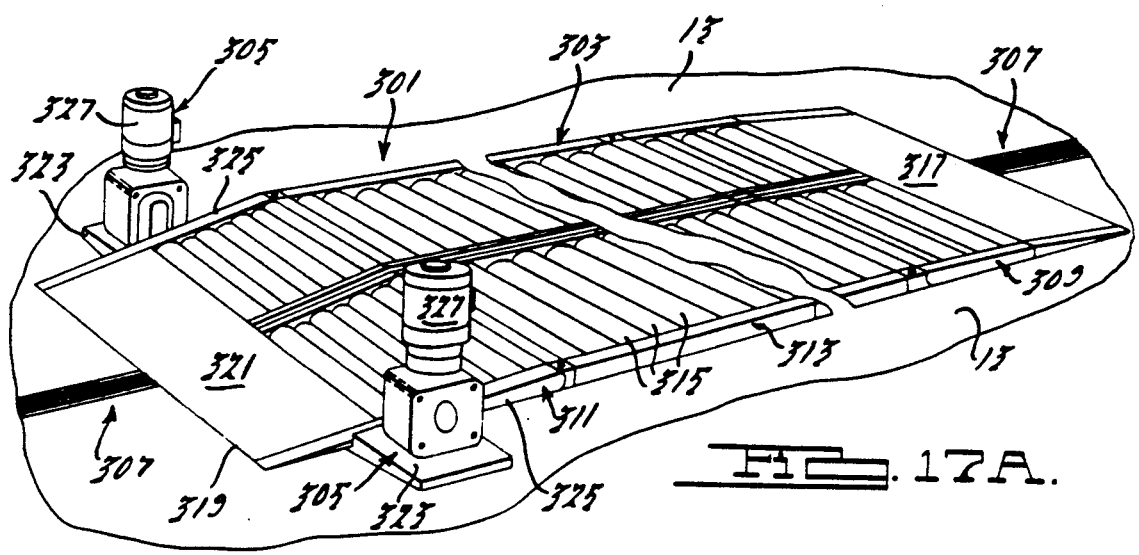
FIG. 17A is a somewhat schematic perspective view of a modification in which there is a tapered platen at each end of the load support and transfer member so that the device can pick up and move a load from either end and for two or more lengths from the dock face into or out of a trailer.

Referring to FIG. 17A, a modified form 301 of load transfer device 1 is illustrated. The modified load transfer device 301 is substantially the same as device 1 in all respects except that the rear section 33 of the member 3 in device 1 is made similar to the front section 31, i.e., tapered with a chisel-point platen at its end. Thus, the load transfer device 301 of FIG. 17A has a long, flexible, load support and transfer member 303 (corresponding to member 3) and power means 305 (identical to power means 5) and a drive means the same as drive means 135 including a chain drive assembly 307 that in FIG. 17A is shown to be the same as flush mounted chain drive assembly 155'. However, the chain drive assembly is preferably at least twice as long as member 303, instead of about a foot longer as in the case of device 1.

The flexible load transfer member 303 like member 3 is composed of a front section 309, a rear section 311, and a series of intermediate sections 313, all hinged together on preferably 4 ft. centers and including lower rollers to roll on the floor 13 and upper rollers 315 to form a low friction, freight receiving deck means. The front section 309 is the same as front section 31 and includes a tapered platen 317 corresponding to platen 25. In this modification, the rear section 311 is also tapered to a chisel-like point 319 by means of a tapered platen 321 which may be the same as platen 317 (or 25). Preferably, longitudinally inwardly of the platen 321, bracket means 323 (corresponding to bracket means 113) are affixed to the outer sidebars 325 of the rear section 311 and power units 327 (the same as power units 101) are rigidly mounted on them on opposite sides of the section 311 and member 303.

The load transfer device 301 can be used to remove a load of freight from a standard trailer, move it two or more lengths from the dock face 17 (depending upon the length of chain assembly 307), and slip from under the load to leave it on the floor 13. It can also be operated vice versa. Because both ends of the device 301 have the tapered platens, the device 301 can slip out from under loads (using suitable load blocking means such as 191) by either forward or rearward movement relative to the load. Similarly, either end of the device 301 may be used to slip under a load on the floor 13. This makes it possible, if desired, to preassemble a load in the proper cubic configuration on the floor 13 to the rear of the device 301 instead of on the member 303. The device 301 can then be moved to the rear to slip under and pick up the load and then reversed in direction to move forwardly and transfer it into the storage compartment.

Figure 17B:
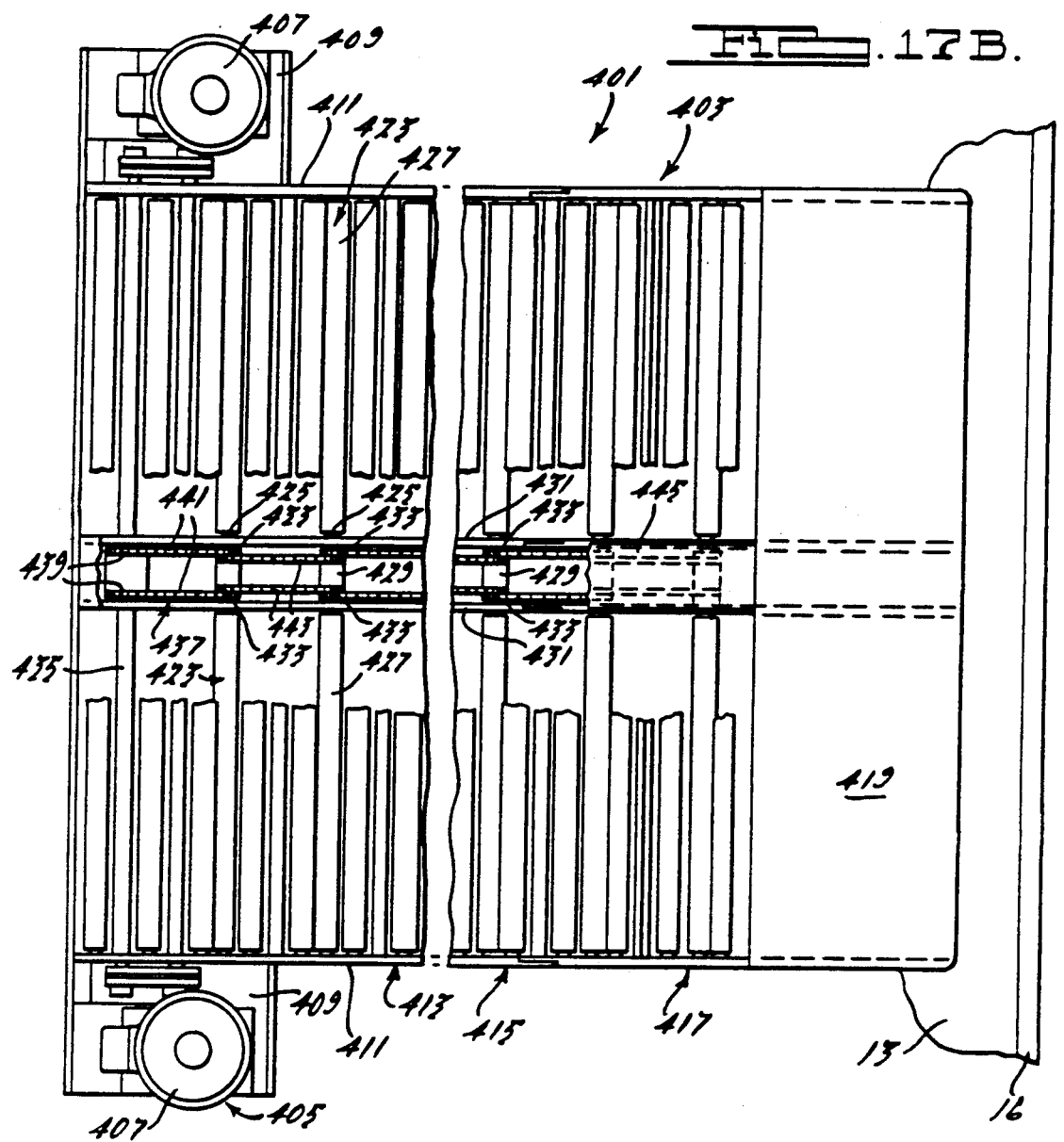
FIG. 17B is a plan view, broken away, of another modification in which the chain on the floor is eliminated and the floor rollers are driven by the power units.
Figure 17C:
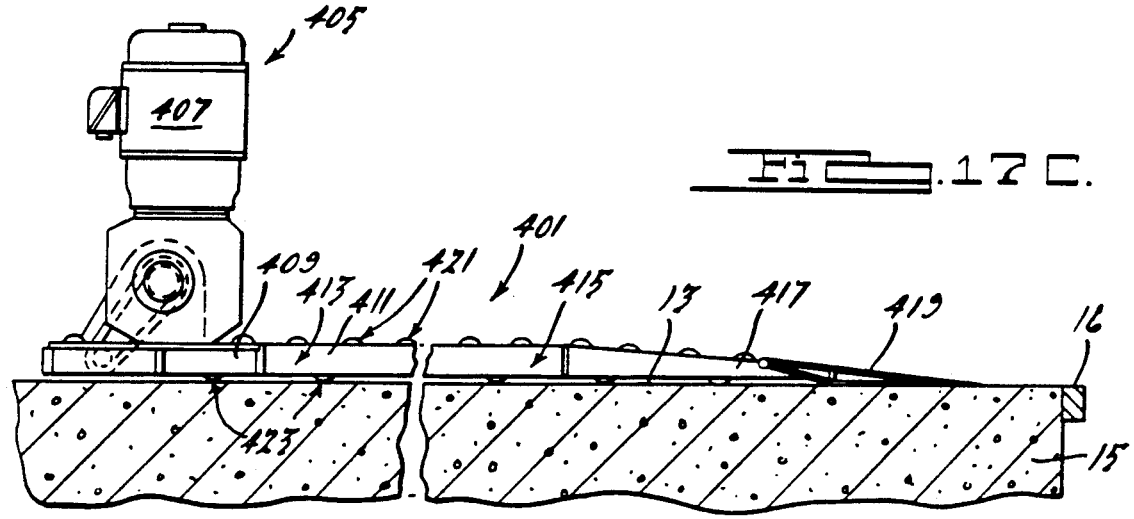
FIG. 17C is a side elevation of the structure of FIG. 17B.

Referring to FIGS. 17B and 17C, another modified form 401 of load transfer device 1 is illustrated. The modified form is identical to device 1 in all respects except that the drive means is modified to eliminate the floor mounted chain drive assembly. In device 401, the drive means includes the lower rollers that ride on the floor 13, these rollers being connected to and driven by the power means. The device 401, therefore, has more mobility than device 1.

The load transfer device 401 has a long, flexible, load support and transfer member 403 which is substantially the same as member 3 (or 303 of device 301, FIG. 17A). It has power means 405 which is identical to power means 5 of device 1 including power units 407 mounted on brackets 409 extending outwardly from sidebars 411 on the rear section 413 of member 403. The member 403 also includes intermediate sections 415 and a front section 417 with a tapered-to-a-chisel point platen 419, all hinged together on preferably four ft. centers and otherwise corresponding substantially to sections 33, 35, and 31, respectively, of member 3. As in the case of member 3, the member 403 has upper roller assemblies 421 forming a low friction freight receiving deck means and lower floor engaging roller assemblies 423 including transverse shafts 425, corresponding generally to shafts 93 (see FIG. 12), and outer rollers 427 and inner rollers 429 mounted on the shafts 425. However, in device 401 the rollers 427 and 429 are keyed to the shafts 425 to rotate with them and the shafts 425 are rotatably mounted by bushing or ball bearing means or the like (not shown) on the outer sidebars 411 and the inner sidebars 431. The shafts 425 also have pairs of chain sprockets 433 keyed to them between the ends of the inner rollers 429 and the adjacent inner sidebars 431.

The power units 407 drive a transverse drive shaft 435, corresponding to drive shaft 103, which at its center portion between inner sidebars 431 operates a drive means 437 for device 401 including chain sprockets 439 over which are trained drive chains 441 that extend to and are trained over outer sprockets 433 keyed on the adjacent floor roller shaft 425. Similarly, the drive means 437 further includes chains 443 that extend from this shaft 425 to the next shaft 425 and so on until enough of the floor roller assemblies 423 are driven to obtain the desired traction. A cover means 445 may be placed on top of inner sidebars 431 to cover the moving parts. It is understood that the rotary speed of drive shaft 435 and the various sprockets are sized and arranged to drive the various floor roller assemblies 423 at an appropriate speed and torque.

Since the drive means 437 does not include a floor mounted chain, as in the previous embodiments, the device 401 has more freedom of movement, being limited mainly by the electrical power cable (not shown) for power units 407.

Referring now to FIGS. 18–33, a modified form 501 of load transfer device is shown which has a different power and drive means than device 1 and includes a mechanical load restraint that functions automatically to block loads when the device 501 is withdrawn from underneath them.

As seen in FIGS. 18–21, the device 501 has a long, vertically flexible load support and transfer member 503 that carries a power means 505 under a cover 506 at its rear end whereby it can transfer freight articles 7 into or out of a storage compartment 9 in a trailer 11 by back and forth longitudinal movement on the floor 13 of the dock 15. The trailer 11 is backed against bumper 16 at the front end 17 of the dock so that the floor 19 of the trailer is substantially flush with the dock floor 13 and a floor plate (not shown) can be used to bridge any irregularity between the open end 23 of the trailer and the dock end 17, i.e., between floors 13 and 19.

When used to load a storage compartment, such as the inside 9 of trailer 11, the freight elements 7, such as containers, pallets, racks, bins, skids, slipsheets, etc., are side-loaded or pre-staged on load transfer member 503 by hand, fork lift truck, crane, powered conveyor unit, automated means, etc., in a cubic configuration to suit the internal dimensions of the compartment, the member 503 having an effective length and width such that it can support a load fitting the entire compartment. After the member 503 is loaded, power means 505 is actuated and the member 503 is moved across floors 13 and 19 until the load is fully inside of the space 9. At this point a load restraint means, to be described later, is actuated to hold the load in the trailer, and the power means 505 is reversed whereupon the member 503 is slipped from beneath the load and returned to a position on the dock 15.

When used to unload a storage compartment, such as the inside 9 of trailer 11, the power means 505 is actuated to move the member 503 across the floor into the trailer through its open end 23. The member 503 has as its front section a thin tapered-down-to-the-floor, plate-like platen 525 with a chisel-like leading edge and this is driven beneath the freight elements 7 which are on the floor 19 of the trailer, though a slip sheet may be desirable beneath some loads. When the member 503 is beneath all of the load to be removed, the power means 505 is reversed and the device 501 returned to its original position (FIG. 18) on the dock 15. The freight elements can then be taken from the member 3 by any desired means, manual, automatic, or combinations thereof.

The device 501 is preferably designed to travel at a rate of about 25 feet/minute so that it can completely load or unload a 48 ft. storage compartment in about 4 minutes. The member 503 is preferably about 3½" in height with a nominal load capacity of about 60,000 lbs. which it can move in one cycle.

As seen best in FIGS. 18–21, 24, and 27–30, the load support and transfer member 503 includes a front section 531 containing the platen 525, a rear section 533 on which is carried the power means 505, and a series of substantially identical intermediate sections 535 located between the front and rear sections. Sections 531 and 535 preferably have an effective length of 4 ft. Rear section 533 with the power means 505 is preferably 7 ft. long. The number of sections 535 used in member 503 depends upon the length of the loads which the device 501 is intended to transfer. For example, if it is intended to be used primarily to transfer loads into and out of a 48 ft. trailer, there would be ten sections 535 making the overall length of the member 503 about 51 ft.

Each section 535 comprises a rigid frame 537 which is hinged at opposite ends along transverse axes to adjacent sections (including end sections 531 and 533). The hinge connections provide vertical flexibility so that the member 503 can ride over unevenness in the floors 13 and 19. The hinge connections are designed to provide stability in a lateral or transverse direction to help the sections 531, 533, and 535 remain in straight, longitudinal alignment during operation of the device.

Referring to FIGS. 24 and 28, each frame 537 comprises outer longitudinal sidebars 539 and a center bar 541. The sidebars 539 and center bar 541 are rigidly joined to one another by transverse T-bars 543 (FIG. 24) which may be longitudinally spaced from each other and welded at opposite ends to the sidebars and center bar. Opposite ends of the bars 539 and 541 are shown to be rounded as seen at 545 and have hinge shaft receiving openings 547 located about 48 in. apart and on the centerlines of radii 545, i.e., midlines of the bars.

As seen in FIG. 28, the overlapped ends of the sidebars 539 and center bars 541 are reduced in width by offsets 549 so that adjacent frames 537 interfit in a way to provide lateral stability and alignment of hinge openings 547 whereby they can receive the hinge shafts 551. The shafts 551 are preferably fixed in position by cross pins 553 to the rear portions 549 of one frame and pivoted in the front portion of the other frame by means of bushings 555 that may be lubricated through fittings 557.

Referring to FIGS. 29 and 30, it will be seen that the frame 537' of the front section 531 is the same in principle as the frame just described for sections 535, but has sidebars 539' and a center bar 541' that are tapered down along their lengths to a front end of about ¼" radius. The platen 525 extends over about one half the length of section 531 and comprises upper and lower steel plates 563 and 565 welded to each other and to the side and center bars and reinforced by the angle bar 567 welded to all of them. A ½" dia. steel cross bar 569 is welded to the front ends of plates 563 and 565, forming the leading edge of device 501, and a similar bar 569' may be welded for structural purposes at the rear edge of the platen 525.

The rear section 533, though longer, is essentially the same in principle and construction as sections 531 and 535. Some details of its construction will appear hereinafter.

The various sections 531, 533, and 535, have deck roller means or the like 571 mounted thereon to provide a low friction freight deck means for the member 503. The roller means preferably comprises a series of roller assemblies 573 (and 573') of about 2¾" O.D. located on 6" apart transverse axes located so that they project about ¼" above the tops of the adjacent sidebars and centerbars.

The various sections 531, 533, and 535 also have floor roller means to enable the member 503 to move easily across floors 13 and 19. The floor roller means is preferably substantially the same in construction as the deck roller means 571 and preferably comprises a series of roller assemblies 583 (and 581') of about 2¾" O.D. and less and located on 12" apart transverse axes and to project about ¼" below the bottom surfaces of the adjacent sidebars and center bar.

As shown in FIG. 27, the roller assemblies 573 include a round support shaft 591 which extends transversely through aligned openings 593 in the side and center bars. Screw means 595 may be used to fix the shaft in stationary position in these bars. Suitable sealed low friction bearing sets 597 are fixed in position on the shaft 591 by screw means 599 so that a pair of sets 597 rotatably supports opposite ends of each of the roller forming cylindrical sleeves or tubes 601. Appropriate lubrication passages 603 for lubricating the bearing sets 597 may also be provided.

The floor roller means and floor roller subassemblies 583 are preferably substantially the same as deck roller means 571 just described in connection with FIG. 27. However, the floor roller support shafts 585 are displaced downwardly so that the roller 583 (and 581') project below the side and center bars as already indicated.

Referring in particular to FIGS. 20–23, the power means 505 is mounted on and carried by the rear section 533 which is preferably 2–3 ft. longer than the sections 531 and 535, though its principle of construction is basically the same. Thus, it has side bars 39a and a center bar 41a at the rear ends of which and bolted to their top surfaces is a transverse platform 611 preferably in the form of an inverted channel with downwardly extending legs 612 (FIG. 23). Centered beneath the platform 611 are floor roller means 581a (FIG. 22) which are substantially the same as the roller means previously described.

While the power means can be of various different specific forms, even non-electrical, there is illustrated for the particular example mentioned above, a reversible 10 H.P. electric motor 615 bolted to the platform plate 611 and driving a fluid coupling 617 which in turn drives a pair of V-belts 619 that turn the input end of a speed reducer 621 also mounted on platform 611. The output end of reducer 621 is supported in a bearing 623, mounted on platform 611, and drives a roller chain 625 which in turn drives a sprocket 627 keyed on to the transverse drive shaft 629. The drive shaft 629 is rotatably supported in bushings 631 in the side and center bars 539a and 541a and its opposite ends 633 project outwardly beyond the outer sidebars 539a.

The shaft 629 provides the desired power and torque at the desired rotary speed to operate an external drive means 634 (FIG. 25) that converts the torque of the shaft 629 into slow, smooth, steady, continuous linear motion of the load support and transfer member 503. As seen best in FIGS. 23, 25 and 26, the drive means includes chain drive sprockets 635 keyed one to each end 633 of the drive shaft 629 and rotated by it. It also includes a pair of long, stationary roller chains 637, one being trained over the top of each shaft sprocket 635 and guided to remain in mesh with it over a desired arc by the inner channel-shaped guide surface 639 of a guide block 641. Each of the guide blocks 641 is affixed by bolts 643 against the vertical outer face of the adjacent sidebar 539a and are therefore movable with the rear section 533.

Figure 31:
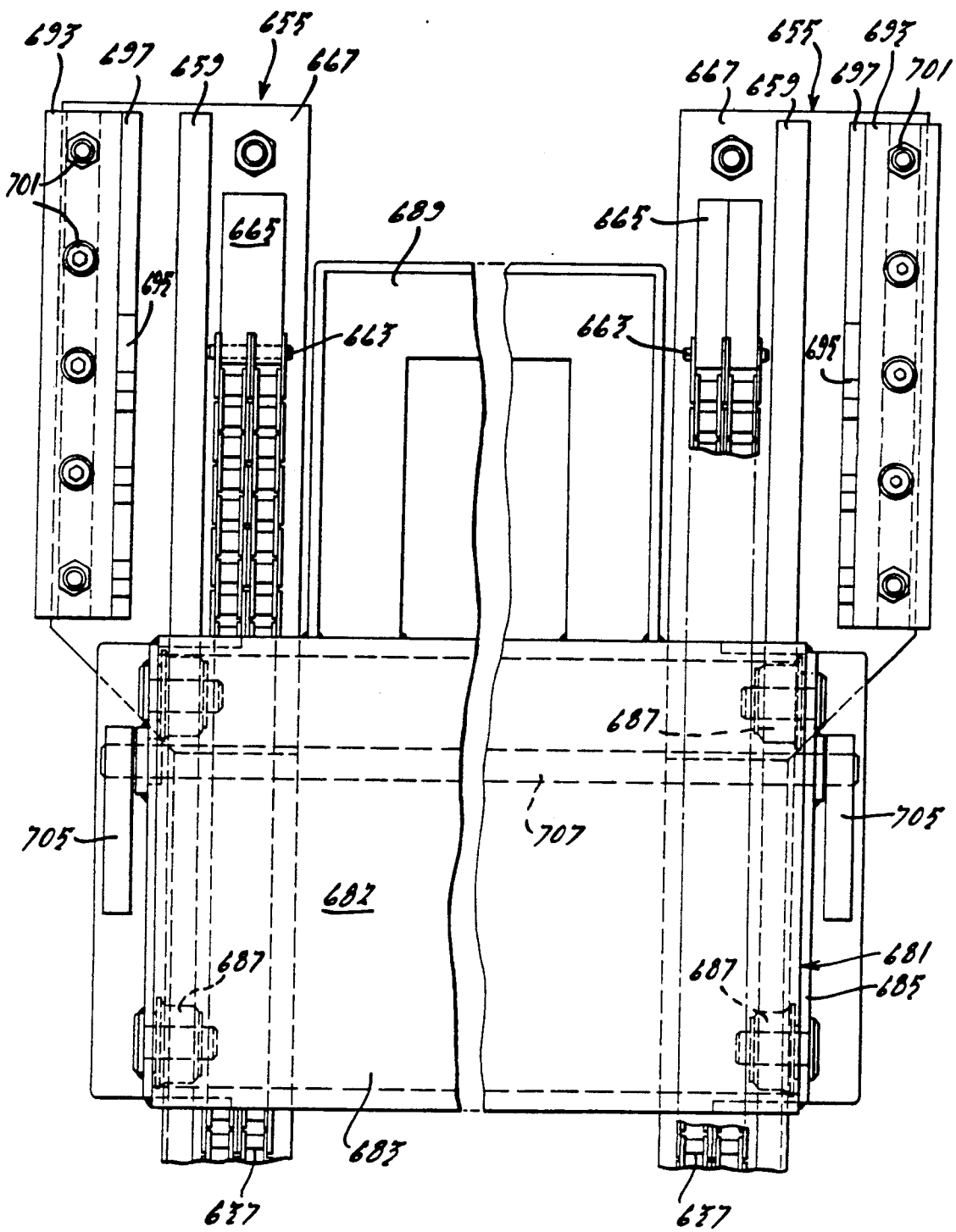
FIG. 31 is a top plan view, broken away, of the semi-automatic load restraint means used in the modification of FIGS. 18–30 showing it close to operative position near the front end of the chain drive assembly.

However, the two roller chains 637, which are located alongside but outside of the member 503, do not move with the device 501 but are fixed in longitudinal positon on dock floor 13. The ends of chains 637 are secured to end sections 647 of long chain tracks 655 with the rear ends preferably secured through chain tensioning devices 649 that include slide blocks 651 (FIG. 22) operated by bolts 653 for adjusting the tension in the chains. Each track 655 includes a bottom plate 657 and a side rail 659 at its outer edge and welded to it. Bolts 661 or the equivalent removably secure the tracks 655 to the floor. The chains 637 lay on the tops of track plates 657 but can be lifted from the plates as illustrated in FIGS. 25 and 26. FIGS. 19, 21, and 31 show the front ends of the tracks 655 and/or chains 637 and that they are both preferably at least as long as member 503, preferably being a foot or so longer. The front ends of the chains 637 are pivoted at 633 to front anchor blocks 665 secured in fixed positions on front bottom sections 667 of the tracks 655.

In operation, the power means 505 acting through the chain drive means 634 energizes and moves the load transfer member 503, with or without load, into and out of the compartment 9. When the drive shaft 629 is rotated counterclockwise, as seen in FIG. 26, drive shaft torque will be converted into chain tension acting against front chain pivots 663. As the sprockets 635 rotate in the chains 637, they pull the shaft 629, guide blocks 641, rear section 533, and entire member 503 forwardly, or to the right in FIG. 26, toward the front end 17 of the dock 16 and toward and into the trailer 11.

Conversely, if the power means is reversed and the shaft 629 rotated in a clockwise direction, the member 503 must move to the rear (left in FIG. 26) and out of and away from the trailer 11. Tension in the chains 637 provides means to hold the shaft 629 and rear section 533 against the floor, resisting buckling tendencies, if any, while the chain assemblies and guide blocks 641 provide means to guide movement of the member 503 in a straight path. Surface irregularities are forgiven by the vertical flexibility of the members 503 due to the hinge connections between the sections.

In an unloading operation, the chisel-like leading edge 569 (FIG. 29) in conjunction with slow, smooth, steady, continuous motion of the member 503 and platen 525 and in further conjunction with the narrow taper of platen 525 and the low friction deck rollers 573' should enable the platen to slide under freight elements 7 with minimum compressive force on the member 503. Tendencies toward buckling, if any, would be further resisted by the weight of the articles themselves after they are on section 531 and succeeding sections 535.

After the device 501 has been used to transfer a load into a storage compartment 9 and it is necessary to slip the member 503 out from underneath the load, it is desirable to block the freight articles so that they stay in the compartment as the member 503 moves out. The device 501 includes a load blocking or restraint means 681 with a carriage means 682 (FIGS. 18-20 and 31-33) to accomplish this, though other means could also be used if desired. The carriage 682 has a top portion 683 which extends transversely across the member 503 and side tracks 655. It has vertical sides 685 at opposite ends of top 683 which each rotatably support a pair of wheels 687 that freely ride on the tops of the chain track rails 659. The carriage 682 is simply pushed in the forward direction by engagement of guide blocks 641 with it. For reverse movement, it is pushed by hand. Actual contact with the freight load is made by the front end of a U-shaped bumper element 689 that projects rigidly forwardly from the front side of carriage 182 for a distance sufficiently long to enable it to engage and block a load in compartment 9 while the carriage wheels remain on the rails 659.

The carriage 682 is held in the load blocking or restraint position by a ratchet means 691 which automatically functions when movement of member 503 reaches the front ends of tracks 655. The ratchet means 691 includes angle shaped ratchet bars 693 which are fixed on the tracks 655 and have ratchet teeth 695 cut into their vertical legs 697. The bars 693 are held by spacers 699 above track plate sections 667 and the spacers have openings for bolt means 701 whereby the bars 693 are bolted to the dock 16. Outwardly extending flanges 703 (FIG. 33) on the vertical sides 685 of the carriage 682 fit easily beneath the bottom faces of bars 693 to act as hold-down means for the carriage to keep the wheels 687 on the rails 659.

Latch bars 705 are pinned to opposite ends of a cross shaft 707 that is pivotally supported in the opposite sidewalls 685 of the carriage 682. When the latch bars are in the angled position of FIGS. 20, 31, and 32, i.e., on the rear side of the centerline of pivot shaft 707, they will engage ratchet teeth 695 so that the carriage 182 and bumper 689 cannot be pushed in a rearward direction. They will therefore enable the load restraint means 681 to block rearward movement of a load even though the transfer member 503 if pulled rearwardly out from underneath the load. When it is desired to do so, the carriage 682 can be freed to roll on rails 659 to the rearward position of FIGS. 20 and 21 by rotating the bars 705 over the center of shaft 707 so that they are on the front side of the centerline. Stops 709 on the carriage walls 785 may be provided to position the ratchet bars in the forward or non-latching position.

As indicated above, the load transfer devices of the invention can be located inside of the storage compartment, for example in the storage compartment 19 of a dedicated trailer 11, instead of on the dock floor. In such an application the external power means 5 of device 1 or the external drive means 634 of device 501 would take up space on the outside of the flexible load support and transfer members 3 or 503 so that these members would have to be somewhat narrower than the full interior width of the compartment. For dedicated vehicle or storage compartment installation it would be preferable, therefore, to combine features of devices 1 and 501. Thus, the load support and transfer member 3 along with its drive means 135 and floor mounting on floor 19 of the track 157 of central drive chain assembly 155 (FIGS. 13-15) would be preferred with the device 1 rotated end for end as seen in FIGS. 1 and 2, (i.e., so that the leading section 31 and platen 25 are at the door 23 of the compartment and the rear section 33 at the front end of the trailer), and the member 3 as wide as the floor 19. The power means 505 of device 501 could then be substituted for power means 5, eliminating bracket means 113. In this arrangement, the motor 615, reducer 621, etc. would be on platform 611 and the platform mounted on sidebars 39 and 41 at the extreme interior end of the device, i.e., adjacent the front end of the trailer. The motor 615 would operate the drive shaft 629 which would be supported in sidebars 39 and 41 but would not project outwardly beyond sidebars 39. Drive shaft 629 would, of course, have a sprocket means 137 as a part of the central drive means 135. Thus, by combining features of devices 1 and 501 the invention can provide an efficient means, mounted in the truck, for rapidly loading and unloading it (in 4 minute cycles, for example). The only modification to the truck would be the attachment of the track 157 and chain assembly 155 to the truck floor 19. They can be easily removed from the truck by removing bolts 161 holding the track to the floor to leave the truck in its original condition prior to installation of the device.

The operation and some advantages of different embodiments of the invention have been set forth above and need not be repeated. Various changes in structure and combinations of features can be made without departing from the spirit and scope of the invention.

I claim:

1. In a mobile load transfer device for rapidly moving a large load of articles such as a truckload of freight from one place to another comprising a long, thin vertically flexible load transfer member having mobile means to engage and roll on a floor and upper anti-friction means to engage and support a load of freight elements, said transfer member including a front end section tapered down to a thin leading edge adapted to slip under the freight element that is resting on a floor, said transfer member further including at least one support section extending outwardly thereof and power means mounted on and supported by said support section and movable with said transfer member, said power means further being mounted and operable to provide power for enabling said transfer member to be driven across a floor on said mobile means at a slow, steady, smooth, continuous rate of motion, said mounting of said power means on said outwardly extending support section further enabling said transfer member to be slipped underneath a load on a floor or from underneath a load for at least a major part of the length of the member.

2. In a load transfer device as set forth in claim 1 drive means operatively connected to said power means and to said transfer member and utilizing power from said power means to drive said load transfer member across a floor.

3. A load transfer device as set forth in claim 2 wherein said power means is adapted to produce a selected output torque and said drive means is adapted to convert said torque into linear motion of said load transfer member across a floor.

4. A load transfer device as set forth in claim 3 wherein said power means has a rotary output shaft producing said output torque, said drive means having a sprocket means mounted on said rear support section of the load transfer member and connected to and driven by said ouput shaft, said drive means including a fixed position vertically flexible chain means separate from said load transfer member and remaining in substantially stationary horizontal position during movement of said load transfer member across a floor, said chain means being in intermeshed engagement with the sprocket means whereby rotation of the output shaft and sprocket means produce linear movement of the sprocket means along the length of the chain means and therefore movement of said load transfer member.

5. A load transfer device as set forth in claim 3 wherein said drive means connects said power means to said mobile means to energize the mobile means to move across a floor.

6. A load transfer device as set forth in claim 3 wherein said rear section is also tapered down to a thin edge adapted to slip under a freight element that is resting on a floor.

7. A load transfer device for rapidly moving a large load of freight such as a truckload of freight from one place to another comprising an elongated truck trailer length longitudinally movable load support and transfer member having a series of hinged together vertically thin sections including a section at one end tapered down to a narrow leading edge adapted to slip under an article to be transferred that is resting on a floor, said transfer member having a top area including a low friction deck means to engage and support a load of articles to be transferred, said transfer member having lower transverse roller means to engage a floor and support the transfer member for longitudinal movement thereon, motor means for providing power to move the transfer member mounted on the other end section of the member and movable with the member, said motor means further being mounted on a support section extending outwardly of said transfer member to thereby enable said transfer member to be driven across a floor and to be slipped underneath said article to be transferred or from underneath said article for substantially the full length of the transfer member, a transversely extending rotary shaft means operably connected to and operated by said motor means at a selected torque and speed, said shaft means being mounted on said transfer member, and drive means for longitudinally moving said transfer member from said one place to another and back operably connected to and operated by said rotary shaft means, said drive means including a sprocket means centrally located on said rotary shaft means and drive chain means operably connected to and operated by said sprocket means, said drive chain means including a vertically flexible longitudinally stationary chain means extending substantially along the midline of and below the transfer member and along its path of movement, said chain means including a chain in intermeshed engagement with the sprocket means whereby rotation of the shaft means and sprocket means produces longitudinal movement of the sprocket means and shaft means along the length of the chain means and therefore movement of the transfer member.

8. A device as set forth in claim 7 wherein said drive chain means is removably attached to the surface of a floor on which the transfer member moves.

9. A device as set forth in claim 7 wherein said drive chain means is flush mounted in a recess in a floor on which the transfer member moves.

10. In a mobile load transfer devie for rapidly moving a large load of articles such as a truckload of freight from one place to another, an elongated, longitudinally movable, load support and transfer member having a top area, the entire top area of the member forming a deck means to engage and support a load of articless to be transferred, said entire top area of the member defining the horizontal cross section and base of a cubic envelope adapted to contain articles to be transferred, said transfer member including longitudinally extending outer sidebar means on opposite longitudinal sides thereof, and bracket means on opposite sides of the member rigid with the sidebar means extending transversely as cantilevers outwardly away from said envelope, power means outside said envelope on opposite sides of the member mounted on said bracket means to be carried by the member and to supply power for longitudinally moving said transfer member, the ends of said transfer member and said cubic envelope being open whereby said member is adapted for end loading of articles onto said deck means.

11. A load transfer device for rapidly moving a large load of articles such as a truckload of freight from one place to another, comprising an elongated longitudinally movable load support and transfer member having an upper deck means to engage and support a load of articles to be transferred and a lower transverse roller means to engage a floor and support the transfer member for longitudinal movement thereon, said transfer member having longitudinally extending outer sidebar means, motor means for providing power to move the member and movable with it mounted on and supported by said sidebar means in a cantilever manner and located transversely outwardly of said upper deck means, a transversely extending rotary shaft means operably connected to and operated by said motor means at a selected torque and speed, said shaft means being mounted on said transfer member and located substantially entirely below said deck means, and drive means for longitudinally moving said member operably connected to and operated by said shaft means and located at least in part on said transfer member below said deck means.

12. A load transfer device for rapidly moving a large load of articles such as a truckload of freight from one place to another, comprising an elongated longitudinally movable load support and transfer member having an upper deck means to engage and support a load of articles to be transferred and a lower transverse roller means to engage a floor and support the transfer member for longitudinal movement thereon, said transfer member having longitudinally extending outer sidebar means, motor means for providing power to move the member and movable with it mounted on and supported by said sidebar means in a cantilever manner and located transversely outwardly of said upper deck means, a transversely extending rotary shaft means operably connected to and operated by said motor means at a selected torque and speed, said shaft means being mounted on said transfer member and located substantially entirely below said deck means, drive means for longitudinally moving said member operably connected to and operated by said shaft means and located at least in part on said transfer member below said deck means, said transfer member comprising a series of hinged together vertically thin rigid sections and having an end section tapered down to a chisel-like leading edge adapted to slip under an article to be transferred that is resting on a floor, said deck means comprising low friction means to engage and support articles to be transferred, said motor means operating said shaft means at a slow, smooth, steady, and continuouos torque and speed to drive said transfer member longitudinally in either direction whereby substantially the full length of the transfer member is capable of slipping underneath a load substantially as long as the transfer member and is capable of being slipped from underneath such load.

13. A load transfer device as set forth in claim 12 wherein both end sections of the transfer member are tapered down to chisel-like end edges adapted to slip under an article to be transferred that is resting on a floor.

14. A load transfer device as set forth in claim 12 wherein said drive means includes a drive connection centrally located on said shaft means below said deck means.

15. A load transfer device as set forth in claim 14 wherein said drive connection comprises sprocket means centrally located on said shaft means below said deck means and said drive means includes drive chain means operably connected to and operated by said sprocket means and operatively connected to and rotating said lower roller means whereby rotation of the roller means produced longitudinal movement of the transfer member.

16. A load transfer device as set forth in claim 14 wherein said drive connection comprises sprocket means, said drive means including a vertically flexible longitudinally stationary chain means extending longitudinally below the transfer member along the path of movement of the transfer member and centrally thereof, said chain means including a chain in intermeshed engagement with the sprocket means whereby rotation of the shaft means and sprocket means produces longitudinal movement of the sprocket means and shaft means along the length of the chain means and therefore movement of said load transfer member.

17. A load transfer device as set forth in claim 16 wherein said chain is trained over the top of said sprocket means.

18. A load transfer device as set forth in claim 17 wherein said drive means includes chain hold-down guide block means affixed to said transfer member below said deck means and engaging said chain to hold said chain in mesh with said sprocket means over a predetermined arc of engagement.

19. A load transfer device as set forth in claim 18 wherein said transfer member includes inner sidebar means comprising a pair of longitudinally extending sidebar members located on opposite sides of the center line of said member, said guide block means being located between and affixed to said sidebar members and said sprocket means being located between said sidebar members.

20. A load transfer device as set forth in claim 19 wherein said lower transverse roller means comprises lower roller assemblies supported in said outer sidebar means and said inner sidebar means, each assembly including an outer roller extending between each outer sidebar means and the adjacent inner sidebar member.

21. A load transfer device as set forth in claim 20 wherein at least some of said lower roller assemblies include an inner roller extending between said inner sidebar members.

22. A load transfer device as set forth in claim 20 wherein each of said hinged together secitons has said outer sidebar means and inner sidebar means, said deck means comprising upper transverse roller means providing low friction support for said articles to be transferred, said upper roller means comprising upper roller assemblies supported in said outer sidebar means and said inner sidebar means, each upper roller assembly including an outer roller extending between each outer sidebar means and the adjacent inner sidebar member.

23. A load transfer device as set forth in claim 22 wherein at least some of said upper roller assemblies include an inner roller extending between said inner sidebar members.

24. A load transfer device as set forth in claim 23 wherein said upper roller assemblies are spaced substantially equally apart from each other and said lower roller assemblies are spaced substantially equally apart from each other, there being substantially twice as many upper roller assemblies as there are lower roller assemblies.

25. A load transfer device as set forth in claim 22 wherein both end sections of the transfer member have platens tapered down to chisel-like end edges adapted to slip under an article to be transferred that is resting on a floor, said chain means being about twice as long as the length of said transfer member whereby the transfer member can be slipped under loads on the floor for its full length or out from underneath loads for its full length with such loads being at either end of the member.

26. A load transfer device as set forth in claim 16 wherein said chain means is mounted on the surface of said floor.

27. A load transfer device as set forth in claim 16 wherein said chain means is mounted in a reccess in said floor so that the top thereof is substantially flush with the floor.

28. A load transfer device as set forth in claim 16 wherein said chain means includes a longitudinally extending track having a bottom wall, said chain resting on said bottom wall and being anchored at opposite ends to said track, said track being affixed to said floor.

29. A load transfer device as set forth in claim 28 wherein said chain means includes an adjustable chain tensioning means for anchoring one end of the chain to the track.

30. A load transfer device for rapidly moving a large load of articles such as a truck load of freight from one place to another comprising an elongated longitudinally movable vertically flexible load support and transfer member having an upper deck means to engage and support a load of articles to be transferred and a lower transverse roller means to engage a floor and support the transfer member for longitudinal movement thereon, said transfer member having longitudinally extending outer sidebar means, a platform means extending between and supported on said sidebar means, motor means for providing power to move the transfer member mounted on the platform means and movable with the transfer member, a transversely extending rotary shaft means operably connected to and operated by said motor means at a selected torque and speed, said shaft means being mounted on said sidebar means and having outer end portions extending outwardly at each end beyond the adjacent sidebar means, and drive means for longitudinally moving said transfer member operably connected to said outer end portions and operated by said shaft means, said drive means including sprockets mounted on said end portions of the shaft means and vertically flexible longitudinally stationary chain means located on each side of said member and below said sprockets, each chain means including a chain in intermeshed engagement with the adjacent sprocket means whereby rotation of the shaft means and sprocket means produces longitudinal movement of the sprocket means and shaft means along the length of the chain means and therefore movement of said load transfer member.

31. A device as set forth in claim 30 wherein said chains are trained over the tops of the sprockets and said drive means includes chain hold down guide block means affixed to said transfer member and engaging said chains to hold said chains in mesh with the respective sprockets over a predetermined arc of engagement.

32. A device as set forth in claim 31 wherein each said chain means includes a longitudinally extending track having a bottom wall, said chains resting on said bottom walls and being anchored at opposite ends to said tracks, said tracks being affixed to said floor, said chain means including adjustable chain tensioning means for anchoring ends of the chains to the tracks.

33. A device as set forth in claim 32 wherein said tracks include longitudinally extending rails, a load restraint means including a carriage extending over the transfer member and riding on said rails, a freight load engaging bumper on said carriage adapted to engage a load of freight and hold it against movement in one direction whereby said transfer member may be withdrawn from beneath the freight load, and holding means for holding said carriage in a load restraint longitudinal position when the member is withdrawn.

34. A device as set forth in claim 33 wherein said holding means includes ratchet means automatically operative when said carriage reaches said load restraint longitudinal position.

35. A device as set forth in claim 34 wherein said ratchet means includes toothed ratchet bars mounted on the tracks and pivoted ratchet bars mounted on the carriage and engageable with the ratchet bars.

36. A device as set forth in claim 35 including carriage hold down means on the carrige and tracks to hold the carriage on the rails.

37. A device set forth in claim 30 wherein said load transfer member comprises a series of vertically thin sections hinged togther and each having said sidebar means and a center bar means, said lower transverse roller means comprising a series of lower roller assemblies supported in said outer sidebar means and said center bar means, each lower roller assembly including a roller extending between each outer sidebar means and the center bar means.

38. A device as set forth in claim 37 wherein said upper deck means comprises an upper transverse roller means providing low friction support for said articles to be transferred, said upper roller means comprising a series of upper roller assemblies supported in said outer bar means and said center bar means, each upper roller assembly including a roller extending between each outer sidebar means and the center bar means, said motor means being adapted to operate said shaft means and to move said transfer member at a slow, smooth, steady and continuous speed, said platform means being located at the rear end section of said transfer member, the front end section of said transfer member being tapered down to a chisel-like leading edge adapted to slip under an article to be transferred that is resting on a floor.

39. A device as set forth in claim 38 wherein said upper and lower roller assemblies are uniformly spaced, said lower roller assemblies being spaced substantially twice as far apart as the upper roller assemblies.

* * * * *